(12) United States Patent
Nishikawa et al.

(10) Patent No.: US 6,747,694 B1
(45) Date of Patent: Jun. 8, 2004

(54) TELEVISION SIGNAL PROCESSOR FOR GENERATING VIDEO SIGNAL OF WIDE DYNAMIC RANGE, TELEVISION CAMERA USING THE SAME, AND METHOD FOR TELEVISION SIGNAL PROCESSING

(75) Inventors: Hiroyuki Nishikawa, Kodaira (JP); Akira Fukushima, Kodaira (JP)

(73) Assignee: Hitachi Denshi Kabushiki Kaisha, Tokyo (JP)

( * ) Notice: Subject to any disclaimer, the term of this patent is extended or adjusted under 35 U.S.C. 154(b) by 748 days.

(21) Appl. No.: 09/588,078

(22) Filed: Jun. 6, 2000

(30) Foreign Application Priority Data

| Jun. 7, 1999 | (JP) | ............................................. 11-159791 |
| Sep. 24, 1999 | (JP) | ............................................. 11-271236 |
| Sep. 24, 1999 | (JP) | ............................................. 11-271237 |
| Sep. 24, 1999 | (JP) | ............................................. 11-271238 |
| Sep. 24, 1999 | (JP) | ............................................. 11-271239 |

(51) Int. Cl.[7] .......................... H04N 5/235; H04N 5/225
(52) U.S. Cl. .............................. 348/229.1; 348/223.1; 348/235; 348/280; 348/672; 348/678; 382/172
(58) Field of Search .......................... 348/223.1, 229.1, 348/296, 363, 672, 678; 382/168, 171, 274; 358/519

(56) References Cited

U.S. PATENT DOCUMENTS

| 5,396,288 A | * | 3/1995 | Tsugita et al. ............ 348/229.1 |
| 5,420,635 A | * | 5/1995 | Konishi et al. ............. 348/362 |
| 5,589,880 A | * | 12/1996 | Tsukui ..................... 348/229.1 |
| 5,929,908 A | * | 7/1999 | Takahashi et al. .......... 348/364 |

\* cited by examiner

*Primary Examiner*—Ngoc-Yen Vu
*Assistant Examiner*—Heather R. Long
(74) *Attorney, Agent, or Firm*—Antonelli, Terry, Stout & Kraus, LLP

(57) ABSTRACT

A television signal processor generates a wide dynamic range video signal on the basis of a first video signal matched to the brightness of a low-brightness region of an object image, and a second video signal matched to the brightness of a high-brightness region of the object image, and adjusting means for subjecting the first and second video signals individually to white balance process. The television signal processor further has means for detecting histogram values of particular signal level regions of the second video signal, means for detecting the peak value of the second video signal, means for determining a combining ratio of the first and second video signals according to the detected peak value and combining ratio, nonlinear processing means for nonlinear-processing the first video signal according to the detected histogram value, and combining means for combining the nonlinear-processed first and second video signals at a predetermined combining ratio.

8 Claims, 28 Drawing Sheets

LONG-TIME EXPOSURE VIDEO SIGNAL WAVEFORM

LOW-BRIGHTNESS AREA WHITE DETECTING RANGE

→ TIME

SHORT-TIME EXPOSURE VIDEO SIGNAL WAVEFORM

HIGH-BRIGHTNESS AREA WHITE DETECTING RANGE

→ TIME

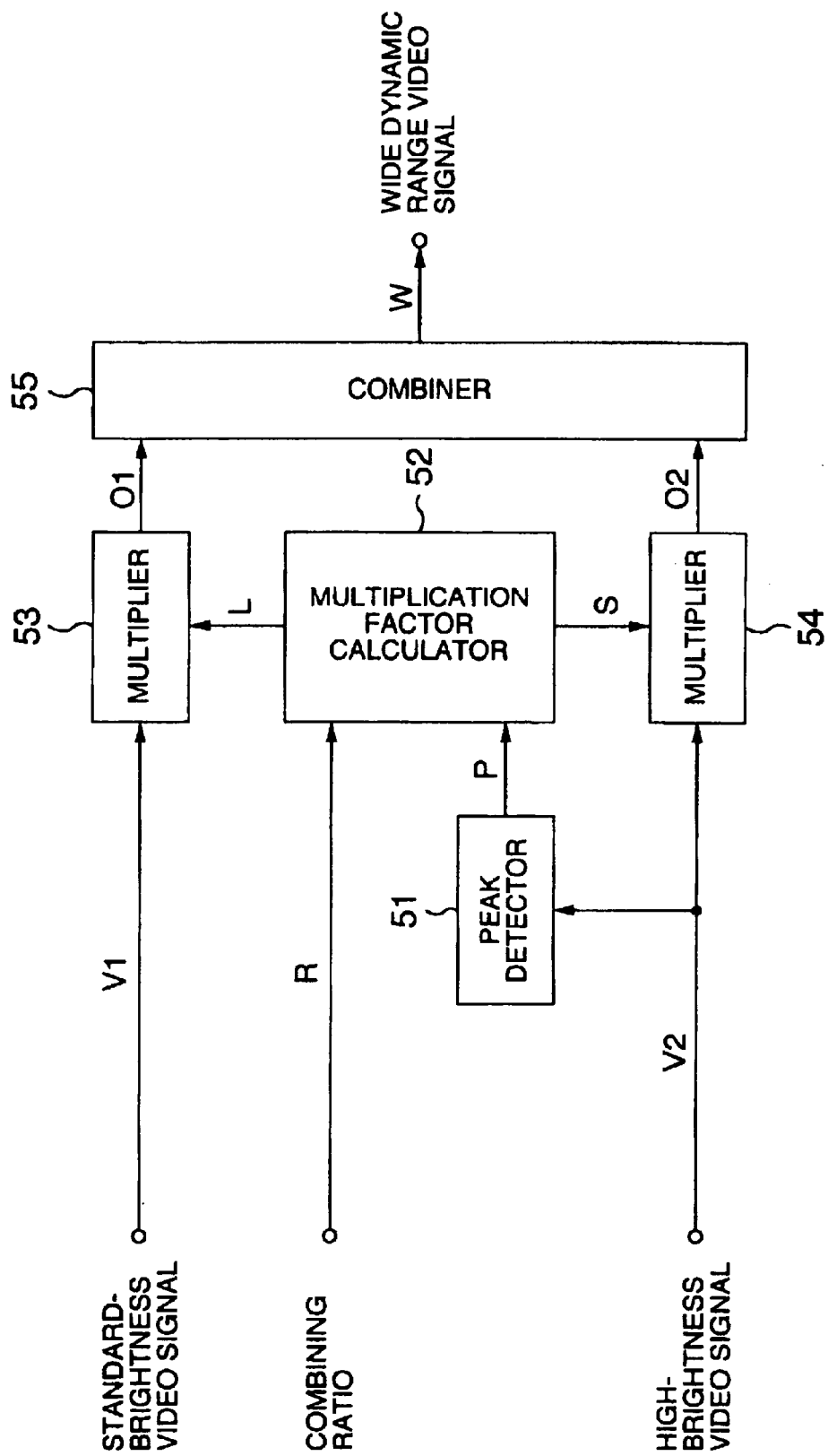

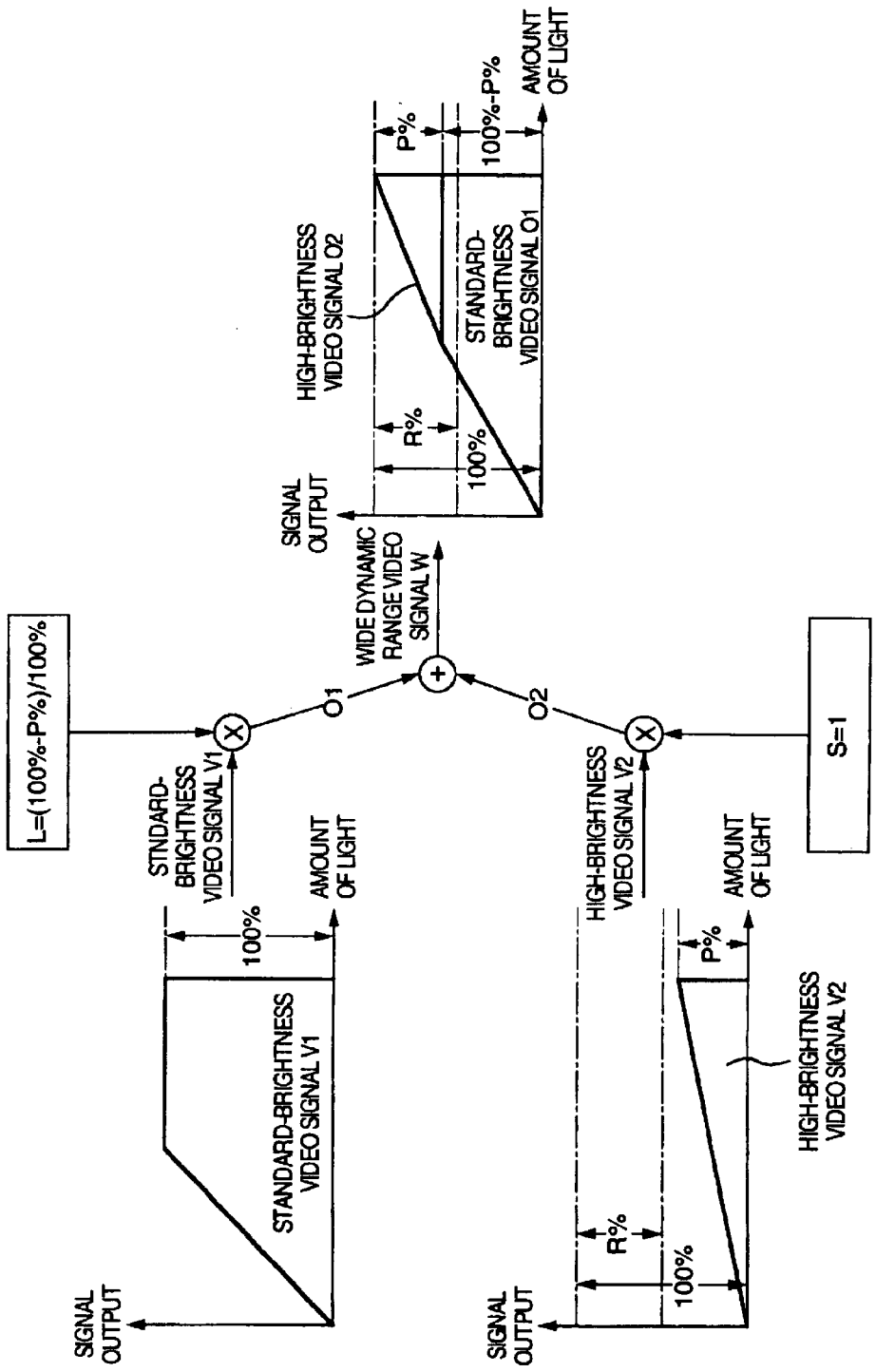

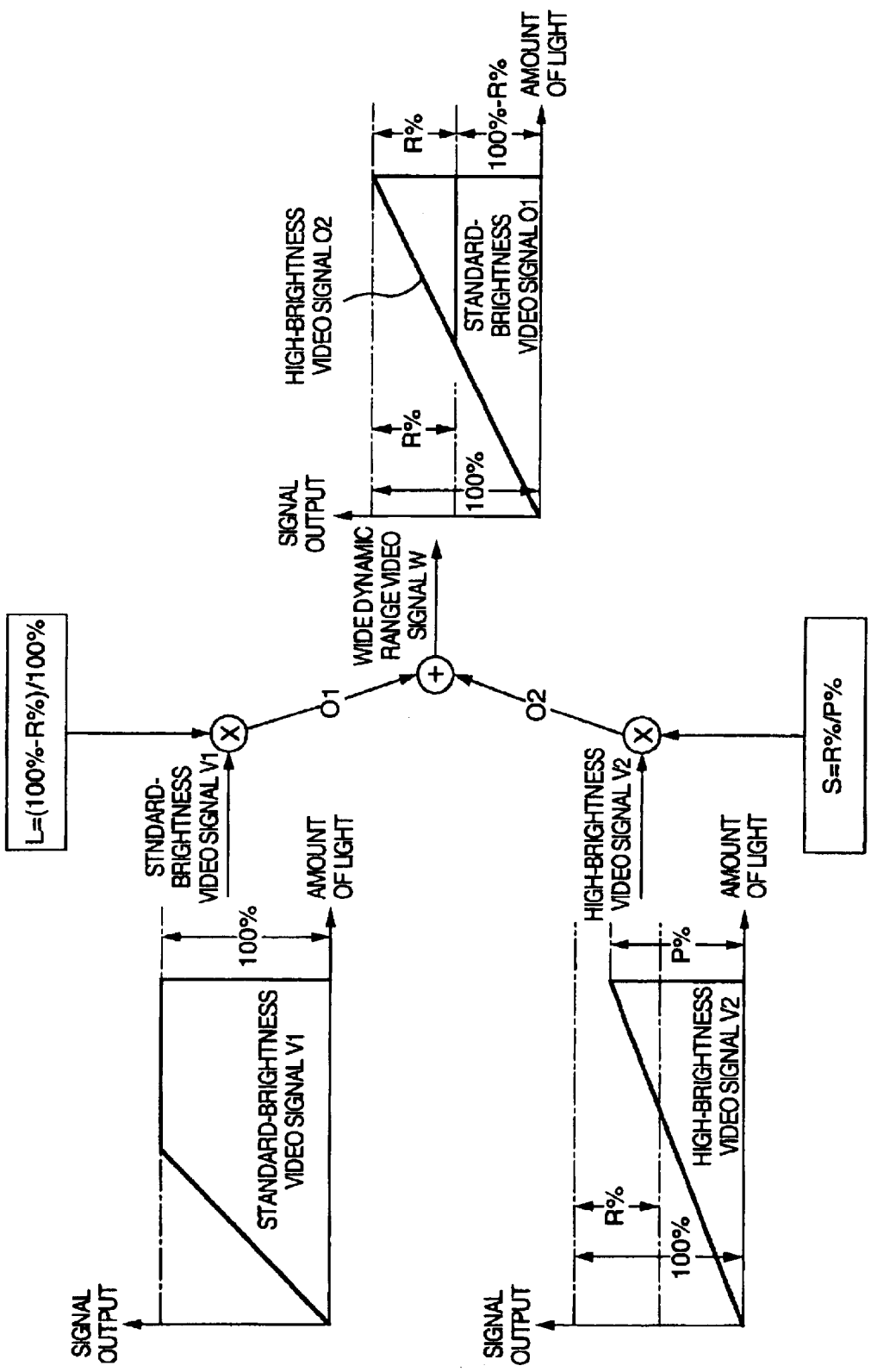

TELEVISION SIGNAL PROCESSOR FOR GENERATING VIDEO SIGNAL OF WIDE DYNAMIC RANGE, TELEVISION CAMERA USING THE SAME, AND METHOD FOR TELEVISION SIGNAL PROCESSING

BACKGROUND OF THE INVENTION

The present invention relates to a television signal processor for generating a video signal in wide dynamic range, a television camera using the same, and a method for television signal processing. The wide dynamic range television camera is designed to properly reproduce any images even though different-brightness images are mixed in an object being shot.

The conventional, general television camera has a limit of about fourfold dynamic range because of limited charge storage capacity of the imaging device. Therefore, as when shooting an objet including both a dark indoor image and a bright outdoor image, or a scene including a mixture of an extremely bright (high-brightness) object (outdoor) and a relatively dark (low-brightness) object (indoor), we cannot help controlling exposure time or the like so that only one of the high-brightness objet and low-brightness object can be obtained to have a correct level. Making the low-brightness portion have a correct level will cause the high-brightness portion white saturation, while making the high-brightness portion have a correct level will cause the low-brightness portion black level cut-off.

Recently, a wide dynamic range imaging device has been developed so as to solve the above problems. As shown in FIG. 7, charge accumulating operation is performed for the normal exposure time during the vertical video period, and for a short exposure time during the vertical blanking period to produce a standard luminance video signal (long-time exposure video signal) V1 by which a standard-brightness object can be reproduced to have a correct level according to the normal exposure and a high-brightness video signal (short-time exposure video signal) V2 by which an extremely bright object can be reproduced to have a correct level according to the short exposure. In addition, a dual amplification system has been developed. As shown in FIG. 8, a video signal C from an imager 22 is supplied to amplifiers 23, 24 having different amplification factors so that the standard-brightness video signal V1 and high-brightness video signal V2 can be produced from the amplifiers.

These standard-brightness video signal V1 and high-brightness video signal V2 produced by the wide dynamic range imager or dual amplification system are, as shown in FIG. 9, supplied to multipliers 26, 27 of which the multiplication factors L, S are calculated by a multiplication factor calculator 25 according to a combining ratio R which will be described later. The multiplied signals are supplied to a combiner 28 where they are combined to produce a wide dynamic range video signal W about 64 times wider than the normal one.

The video signal produced from the imagers of the television camera are subjected to nonlinear processing such as white balance, gamma correction and knee characteristic correction, and then supplied to the outside. The wide dynamic range television camera generates two or more different video signals for one object, and adequately combines that plurality of signals to produce a wide dynamic range video signal. Those plurality of video signals can be produced by changing the exposure condition or gain at the time of shooting as will be described later.

The present invention tries to provide a high-quality video signal by solving the problems that, as described below, are caused by the video signal processing in the wide dynamic range television camera, such as in the white balance process, nonlinear process or signal combining process.

The above television camera that produces a wide dynamic range video signal generates, from its one solid-state imager, two video signals: a long-time exposure video signal with the exposure condition meeting the low-brightness region of an object, and a short-time exposure video signal with the exposure condition meeting the high-brightness region of the object. These long-time exposure and short-time exposure signals are subjected to a certain combining process, and then to white balance process in a video signal processor.

The construction of this conventional television camera will be described with reference to FIG. 5. Referring to FIG. 5, there is shown a charge coupled device (CCD) 11 as a solid state imager for generating a video signal by transducing the light image from an object into a charge image. The imager 11 generates the short-time exposure video signal by, for example, exposure to light for ½₀₀₀ second, and the long-time exposure video signal by exposure to light for a longer time than the short-time exposure video signal, for example, exposure to light for ¹⁄₆₀ second, with their time base compressed during one horizontal scanning period of the video signal produced from the television camera 10. There are also shown a sample and hold/automatic gain controller (CDS & AGC) 12 that samples and holds the video signal from the CCD 11 and amplifies it to a necessary level, and an A/D converter 13 for converting the analog video signal from the CDS & AGC 12 to a digital video signal. Shown at 14 is a synchronizer for separating the long-time exposure and short-time exposure video signals of digital video signals in each horizontal scanning period from the A/D converter 13, expands the their time base to one horizontal period and synchronizes those separated and expanded video signals so that they can be produced at a time. Shown at 17 is a combiner that receives the long-time exposure and short-time exposure video signals from the synchronizer 14, and combines those signals by a predetermined way. In this method for combining, the two input signals are combined to produce such a combined video signal as to have a video signal level corresponding to, for example, the level of a more appropriate-exposure one of the two video signals. As a result of such combining process, for example, the region in which the details are not clear because the long-time exposure video signal shows white saturation on the screen is made appropriate by the correct signal level of the short-time exposure video signal, and the region in which the details are not clear because the short-time exposure video signal shows black level cut-off is made appropriate by the correct signal level of the long-time exposure video signal. The combined video signal from the combiner 17 is supplied to a digital signal processor (DSP) 15. In this DSP 15, the combined video signal is subjected to a certain video treatment for gamma correction and white balance. The processed video signal is supplied from the DSP 15 to the subsequent stage (not shown).

FIG. 6 is a block diagram of one example of the white balance adjuster. This white balance adjuster can be constructed by a DSP or a combination of circuits having the functions of the blocks shown. An RGB gain processor 30 adjusts individually the gains of the amplitude levels of the color signals R (red), G (green) and B (blue). A color difference conversion processor 31 generates color difference signals R-Y, B-Y from the R, G, B signals and Y (luminance) signal. A white signal component detector 32 detects and produces the white signal component included in a certain white detection level frame range from the color difference signals R-Y, B-Y and Y signal. A white balance controller 33 detects in what color direction and how much the white balance is deviated by comparing the white signal components of R-Y and B-Y, and produces a signal WB (corresponding to the color temperature) indicating the deviation of the white balance. A gain controller 34 adjusts the gains of the R signal and B signal in the RGB gain processor 30 in such a direction that the WB becomes zero according to the deviation signal WB.

The object to be shot includes, as shown in FIG. 2, both a human FIG. 20 in a room under fluorescent lighting, and a sunny outdoor scene 21 seen through a window. The room is a dark region (low brightness) as hatched, and the outdoor scene 21 is a much brighter region (high brightness) than the room. Since the light source in the room is fluorescent lighting, and the outdoor scene is under sunlight, the color temperatures are much different in the indoor and outdoor images.

The problems occurring when the conventional wide dynamic range camera makes white balance will be described below. When the object shown in FIG. 2 is shot by the conventional wide dynamic range television camera shown in FIG. 5, two video signals can be produced: an indoor video signal with an appropriate low-brightness exposure level and an outdoor video signal with an appropriate high-brightness exposure level. In other words, the low-brightness image can be shot for a long-time exposure to produce a long-time exposure video signal with an appropriate level, and the high-brightness image can be shot for a short-time exposure to produce a short-time exposure video signal with an appropriate level. The long-time exposure video signal can be produced as an accumulated charge signal in each vertical scanning period from the CCD, and the short-time exposure video signal as an accumulated charge signal in each vertical blanking period from the CCD.

The two video signals are combined by the combiner 17 to produce one video signal. This video signal experiences white balance process in DSP 15. At this time, white level reference for white balance is determined on the basis of an appropriate one of the long-time exposure video signal component with the exposure condition matched to the indoor image or the short-time exposure video signal component with the exposure condition matched to the outdoor image. Therefore, the white balance adjusted for one video signal component becomes correct, but the white balance for the other video signal component of different color temperature is not correct, with the result that either long-time exposure video signal component or short-time exposure video signal component shows unnatural color on the monitor. In addition, when white balance is adjusted so as to match the intermediate color temperature between the long-time and short-time exposure signal components, reproduction of both indoor and outdoor images shows unnatural color.

The present invention is to solve these problems by forcing the chrominance signals of the standard-brightness and high-brightness video signals to be subjected to a predetermined process and to the combining process after the white balance treatment, thereby producing a wide dynamic range video signal with no loss and with an optimum level.

The difficulties in the signal combining process will be described, and in this case the conventional signal combining processor shown in FIG. 9 is used to treat the video signals from a wide dynamic range television camera.

If the maximum combining ratio R of high-brightness video signal V2 occupying part of the obtained wide dynamic range video signal W is represented by R%, the multiplication factor of standard-brightness video signal V1 by L, and the multiplication factor of high-brightness video signal V2 by S, the multiplication factors L, S are given as fixed factors by the following expressions.

$$L=(100\%-R\%)/100\%$$

$$S=R\%/100\%$$

From the above expressions it will be understood that $L+S=1$. Even if both standard-brightness video signal V1 and high-brightness video signal V2 fed to the combiner have the maximum input level of 100%, the signal level after combining is $100\%\times L+100\%\times S=100\%$, and thus the wide dynamic range video signal W can be confined within 100% level.

If the signal level after combining exceeds 100%, the signal component over 100% is compressed up to 100%, or white saturation since the final output of the camera is limited to 100%.

Let us consider the case in which the combining ratio R=50, or the standard-brightness video signal V1 and high-brightness video signal V2 are combined at a ratio of 50%:50%, namely L=0.5, S=0.5. As is obvious from FIG. 13, when the peak value P of high-brightness video signal V2 is smaller than the saturation level 100% of the video signal, for example, 60%, the amplitude of the wide dynamic range video signal W after combining is $100\%\times L(0.5)+60\%\times S(0.5)=80\%$, and thus it does not swing up to the saturation level 100% of the video signal. Accordingly, since the output level 100% of the video signals cannot be made full use of, a low-contrast video image is reproduced.

The present invention is to eliminate these defects by providing a wide dynamic range camera capable of producing a combined wide dynamic range video signal with no loss and with an optimum level.

U.S. Pat. No. 5,589,880 filed Dec. 31, 1996 and granted Tsukui discloses a television camera using two imagers for one object to generate two different video signals from which a wide dynamic range video signal is produced.

JP-A-4-354277 discloses a television camera using a combination of a high-speed shutter, a low-speed shutter and one CCD imager to generate two video signals of different exposure times and to select and produce an appropriate one.

U.S. Pat. No. 5,420,635 discloses a television camera using an optical splitter to split the light from an object into two beams of different amounts of light and using two CCD imagers to receive these beams and generate two video signals.

U.S. Pat. No. 5,455,621 discloses an imaging apparatus which produces wide dynamic range video signals reducing signal saturation and noises within dark image and bright image by processing two video signals having different charging times obtained from an imaging device capable of varying charging time.

SUMMARY OF THE INVENTION

It is an object of the invention to provide a television signal processor for a wide dynamic range television camera capable of proper white balance for any region of one object including image regions of even different color temperatures of light source so that video signals can be generated with excellent color reproduction, a method for signal processing, and the wide dynamic range television camera.

It is another object of the invention to provide a television signal processor for a wide dynamic range television camera capable of properly combining a standard-brightness video signal and high-brightness video signal subjected to white balance process so that appropriate white balance can be made for any region of the shot image, a method for signal processing, and the wide dynamic range television camera.

It is still another object of the invention to provide a television signal processor for a wide dynamic range television camera capable of properly combining a standard-brightness video signal and high-brightness video signal to produce a wide dynamic range video signal with no loss and with an optimum level, a method for signal processing, and the wide dynamic range television camera.

According to an aspect of the invention, there is provided a television signal processor that generates a wide dynamic range video signal on the basis of a first video signal matched to the brightness of a low-brightness region of an object image, and a second video signal matched to the brightness of a high-brightness region of the object image, and that has first adjusting means for subjecting the first video signal to white balance process on the basis of the first video signal to produce a white-balanced video signal, second adjusting means for subjecting the second video signal to white balance process on the basis of the second video signal to produce a white-balanced video signal, and combining means for combining the outputs from the first and second adjusting means.

According to another aspect of the invention, there is provided a television signal processor that generates a wide dynamic range video signal on the basis of a first video signal matched to the brightness of a low-brightness region of an object image, and a second video signal matched to the brightness of a high-brightness region of the object image, and that has means for detecting the peak value of the second video signal, means for determining a combining ratio of the first and second video signals according to the detected peak value, and combining means for combining the first and second video signals at the combining ratio.

According to another aspect of the invention, there is provided a television signal processor that generates a wide dynamic range video signal on the basis of a first video signal matched to the brightness of a low-brightness region of an object image, and a second video signal matched to the brightness of a high-brightness region of the object image, and that has means for detecting histogram values of particular signal level regions of the first and second video signals, means for nonlinear-processing the first and second video signals according to the detected histogram values, and combining means for combining the nonlinear-processed first and second video signals at a predetermined ratio.

According to another aspect of the invention, there is provided a television signal processor that generates a wide dynamic range video signal on the basis of a first video signal matched to the brightness of a low-brightness region of an object image, and a second video signal matched to the brightness of a high-brightness region of the object image, and that has means for detecting a histogram value of a particular signal level region of the second video signal, means for determining a combining ratio of the first and second video signals according to the detected histogram value, means for detecting the peak value of the second video signal, means for nonlinear-processing the first video signal according to the detected peak value and the combining ratio, and combining means for combining the nonlinear-processed first video signal and the second video signal at the determined combining ratio.

According to still another aspect of the invention, there is provided a television signal processor that generates a wide dynamic range video signal on the basis of a first video signal matched to the brightness of a low-brightness region of an object image, and a second video signal matched to the brightness of a high-brightness region of the object image, and that has first adjusting means for subjecting the first video signal to white balance process on the basis of the chrominance signal component and luminance signal component of the first video signal to produce white-balanced chrominance signal component and luminance signal component, second adjusting means for subjecting the second video signal to white balance process on the basis of the chrominance signal component and luminance signal component of the second video signal to produce white-balanced chrominance signal component and luminance signal component, means for determining a first weighting coefficient for the chrominance signal component of the first video signal according to the luminance signal component level of the first video signal, means for determining a second weighting coefficient for the chrominance signal component of the second video signal according to the luminance signal component level of the second video signal, first multiplying means for multiplying the chrominance signal component from the first adjusting means by the first weighting coefficient, second multiplying means for multiplying the chrominance signal component from the second adjusting means by the second weighting coefficient, first combining means for combining the luminance signal components from the first and second adjusting means, and second combining means for combining the chrominance signal components from the first and second multiplying means.

In addition, according to the invention, there are provided television cameras that generate a wide dynamic range video signal, and that have a television signal processor according to any one of the above aspects of the invention, and imaging means for generating the first video signal matched to the brightness of a low-brightness region of an object image, and the second video signal matched to the brightness of a high-brightness region of the object.

Moreover, according to the invention, there are provided television signal processing methods concerned with the above television signal processors according to the invention.

BRIEF DESCRIPTION OF THE DRAWINGS

FIG. 19 is a block diagram of the signal combining process portion of another embodiment of the signal processor according to the invention.

FIG. 21 is a diagram useful for explaining the operation of the signal combining process in the embodiment of FIG. 19 of the signal processor according to the invention.

FIG. 22 is a diagram useful for explaining the operation of the signal combining process in the embodiment of FIG. 19 of the signal processor according to the invention.

DESCRIPTION OF THE EMBODIMENTS

One embodiment of the invention will be described with reference to FIG. 1.

Figure 1:
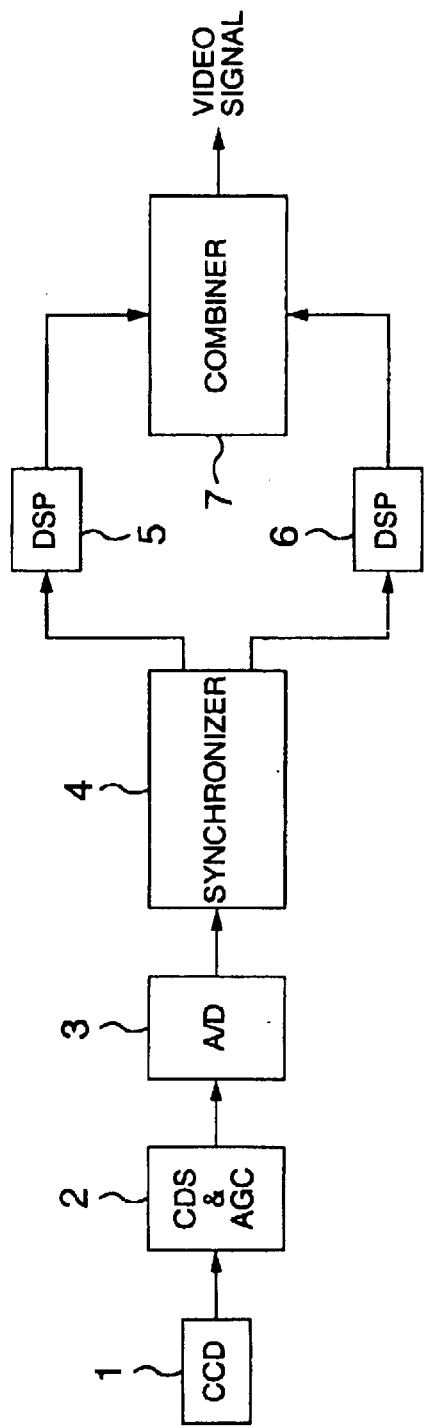
FIG. 1 is a block diagram of the circuit arrangement of an embodiment of the wide dynamic range television camera according to the invention.
Figure 5:
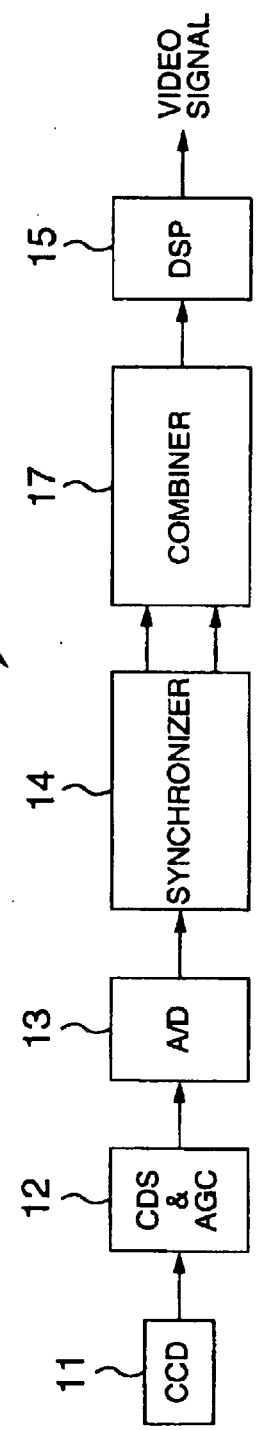
FIG. 5 is a block diagram of the circuit arrangement of a conventional wide dynamic range television camera.

Referring to FIG. 1, there is shown a solid-state imager (CCD) for transducing a light image into a charge image and producing it as a video signal. Particularly, this imager generates a short-time exposure video signal by, for example, exposing to light for 1/2000 second, and a long-time exposure video signal by exposing to light for a longer time than the short-time exposure video signal, for example, about 1/60 second with their time base compressed, in each horizontal scanning period of the video signal produced from this television camera. There are also shown a sample and hold & automatic gain controller (CDS & AGC) 2 for sampling and holding the video signals from the CCD 1 and amplifying them up to certain levels, and an A/D converter 3 for converting the analog video signals from the CDS & AGC to digital video signals. Shown at 4 is a synchronizer for separating the digital long-time and short-time exposure video signals of each horizontal period from the A/D converter 3, expanding the time base of each video signal to one horizontal scanning period, and synchronizing those video signals so that they can be produced at a time.

The long-time exposure video signal produced from the synchronizer 4 is supplied to a video signal processor (DSP) 5, and the short-time exposure video signal from the synchronizer 4 to a video signal processor (DSP) 6. These DSPs 5, 6 force the input video signals to be subjected to predetermined video signal processes, for example, gamma correction and white balance adjustment.

Figure 2:
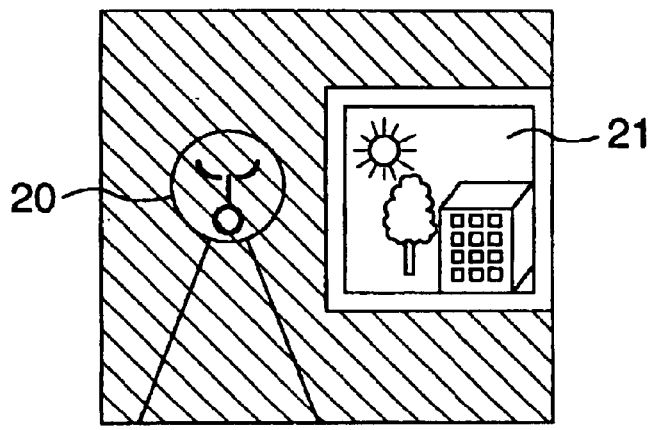
FIG. 2 shows an example of the scene of an object including both high-brightness region and low-brightness region.
Figure 6:
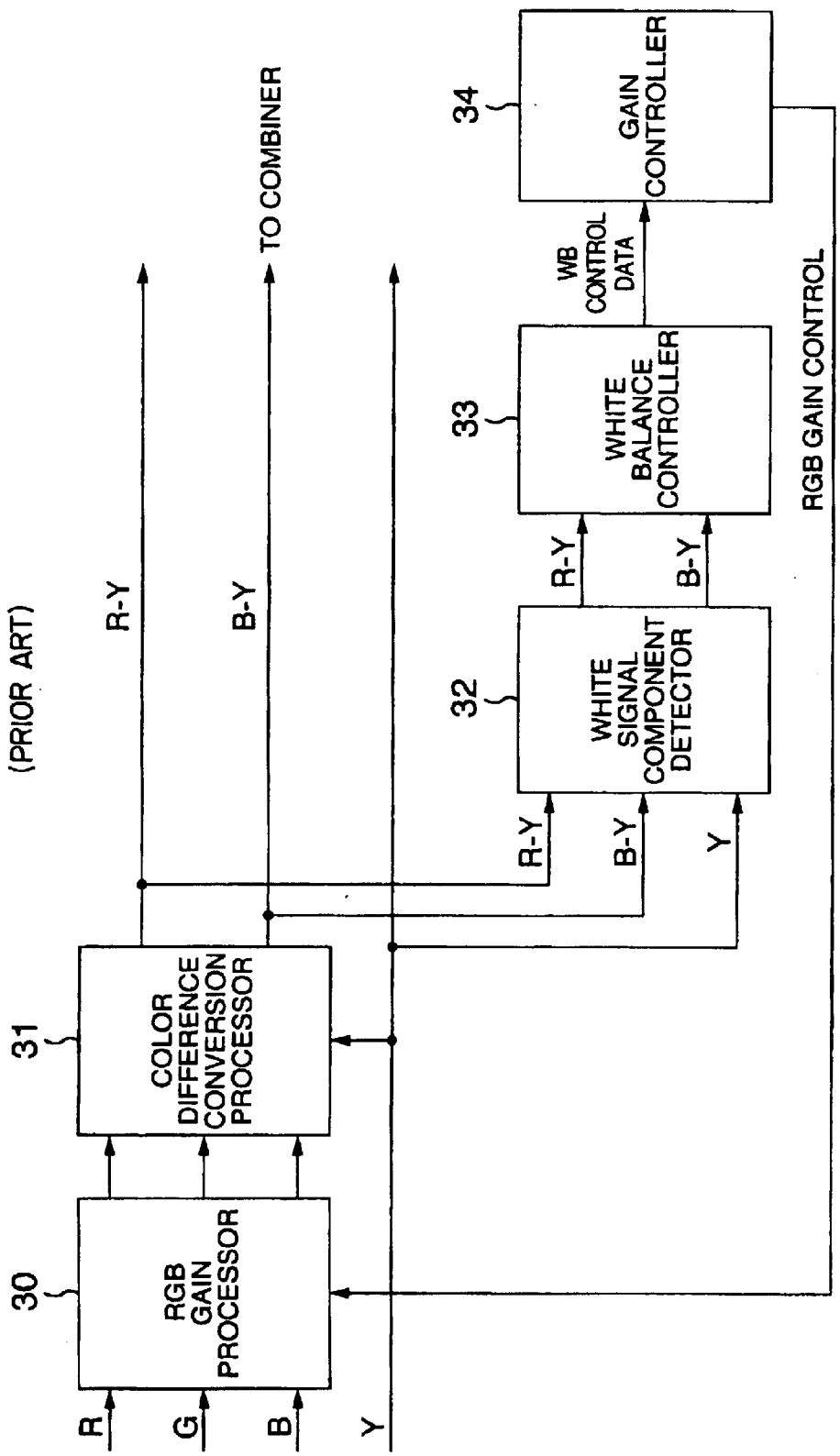
FIG. 6 is a block diagram of an example of a white balance adjuster.

The DSP 5 makes white balance adjustment to the input long-time exposure video signal. When an indoor image under a fluorescent light is shot as a low-brightness area of an appropriate exposure level for the long-time exposure video signal as shown in FIG. 2, the white balance adjustment to the long-time exposure video signal is performed according to the signal of the level within the low-brightness area white detection range of the long-time exposure video signal as, for example, shown in FIG. 3 so that a white object in the low-brightness area can be shot as white. The white balance adjustment can also be carried out by the circuit arrangement shown in FIG. 6.

Figure 3:
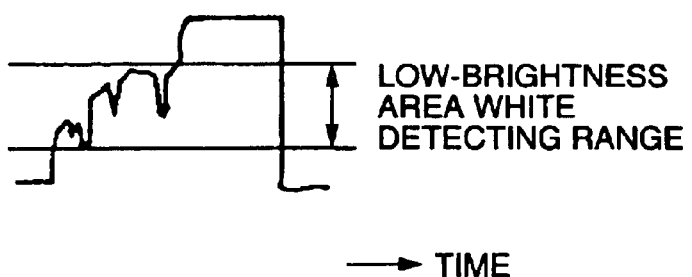
FIG. 3 shows an example of the waveform of a long-time exposure video signal.

The upper limit of the low-brightness area white detection range in FIG. 3 is desirably set to a predetermined level or below, for example, 95% of the maximum video signal level or below so that the low-brightness area detection range does not include a video signal level associated with the high-brightness area. Thus, white balance adjustment more appropriate for the video signal concerning the low-brightness area can be performed without effect of the video signal concerning the high-brightness area.

Figure 4:
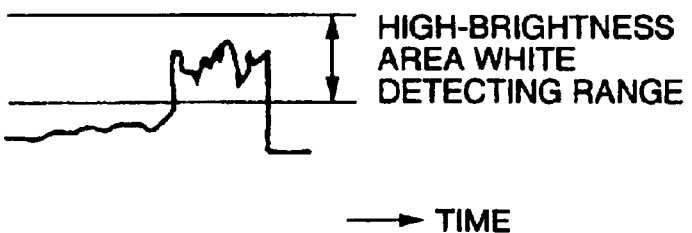
FIG. 4 shows an example of the waveform of a short-time exposure video signal.

The DSP 6 makes white balance adjustment to the input short-time exposure video signal. When the outdoor image under sunlight is shot as a high-brightness area image of a proper exposure level for the short-time exposure video signal as shown in FIG. 2, the white balance adjustment to the short-time exposure video signal is performed according to the signal of the level within the high-brightness area white detection range of the short-time exposure video signal as, for example, shown in FIG. 4 so that a white object in the high-brightness area can be shot as white. As illustrated in FIG. 4, the lower limit of the high-brightness area white detection range is desirably set to a predetermined value or above, for example, 5% of the maximum video signal level, or above so that the high-brightness area detection range does not include a video signal level concerning the low-brightness area. Thus, white balance adjustment more appropriate for the video signal concerning the high-brightness area can be performed without effect of the video signal concerning the low-brightness area.

Shown at 7 is a combiner for combining the input long-time exposure video signal and short-time exposure video signal from the DSPs 5, 6 according to a certain process. In this combining process, a combined video signal is generated of which the signal level is, for example, set to the level of a more appropriate one of the two different exposure video signals. Thus, the region in which the details are not clear on the screen because of white saturation in the long-time exposure video signal is combined with the proper level of the short-time exposure video signal. In addition, the region in which the details are not clear on the screen because of excessive black, black level cut-off in the short-time exposure video signal is combined with the proper level of the long-time exposure video signal. The combined video signal from this combiner 7 is supplied to the following apparatus (not shown).

Thus, according to the television camera of this embodiment, even though the long-time and short-time exposure video signals are produced by shooting an object under illuminations of different color temperatures, the long-time and short-time exposure video signals as the low-brightness and high-brightness area images are individually subjected to appropriate white balance process, and then combined to produce the combined video signal. This combined video signal can be reproduced so that, for example, the white objects of the low-brightness area and high-brightness area are both correct white.

Figure 8:
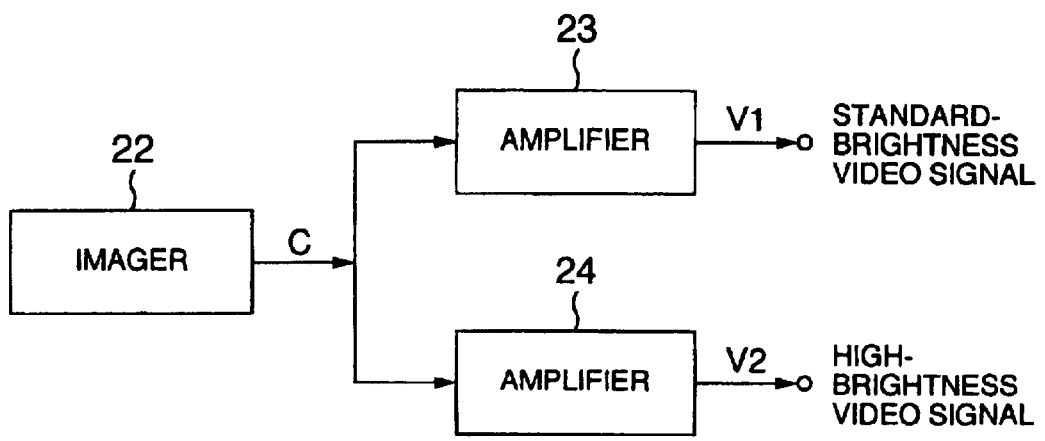
FIG. 8 is a block diagram of a circuit arrangement for generating the standard-brightness video signal and high-brightness video signal.
Figure 9:
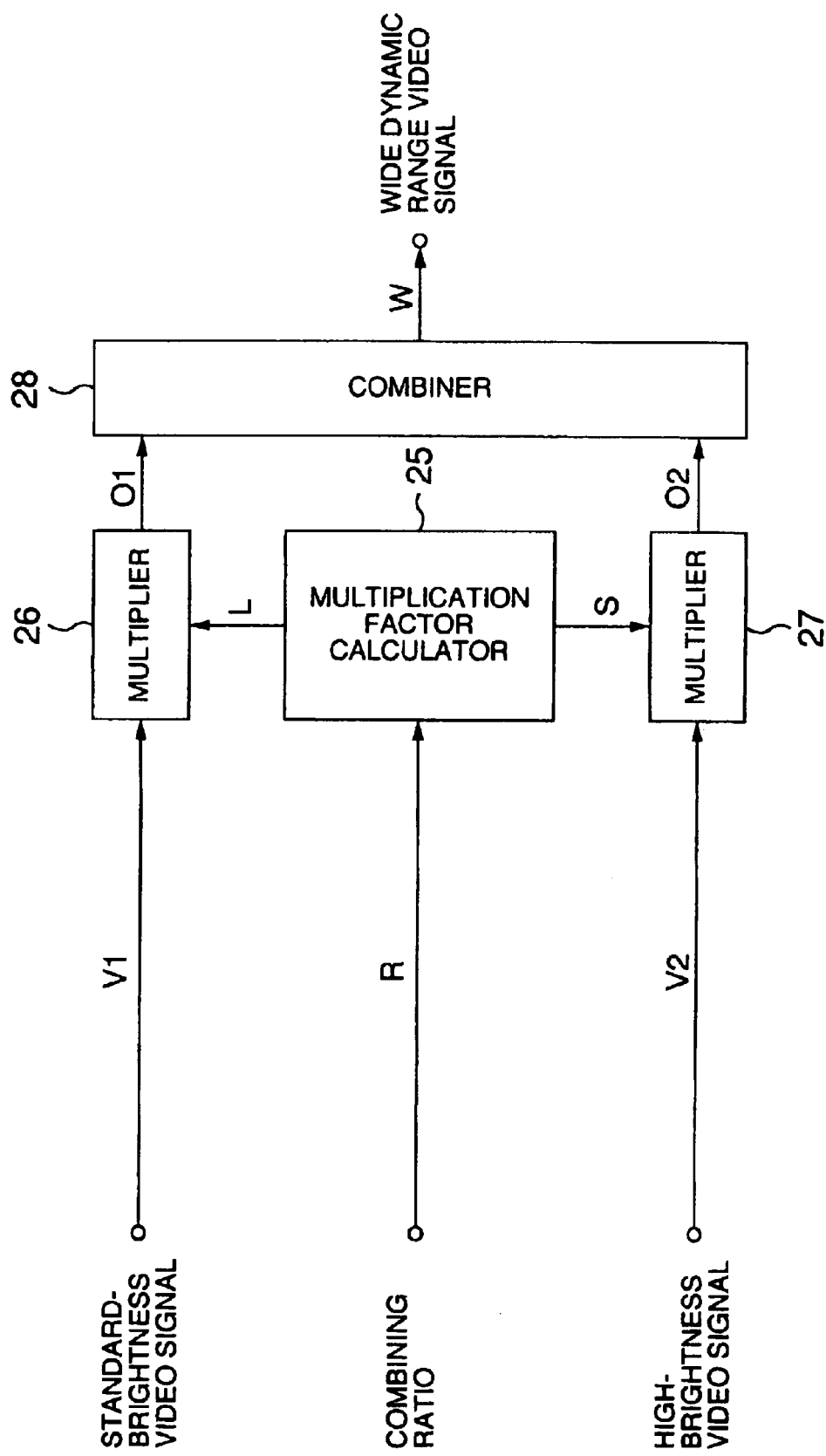
FIG. 9 is a block diagram of a conventional signal combining system.

The present invention is not limited to the above embodiment in which the long-time and short-time exposure video signals of different exposure times from the CCD 1 are used to produce a wide dynamic range video signal. For example, the video signal V1 of a predetermined exposure level and the video signal V2 with the exposure level limited to a smaller level than that exposure level as shown in FIG. 8 may be used to produce a wide dynamic range video signal having the effect of the invention. In addition, two video signals of different exposure levels or two video signals of different exposure times may be produced from the television camera of the invention, though not shown, and supplied to a video signal apparatus (not shown) that follows the television camera of the invention.

Figure 7:
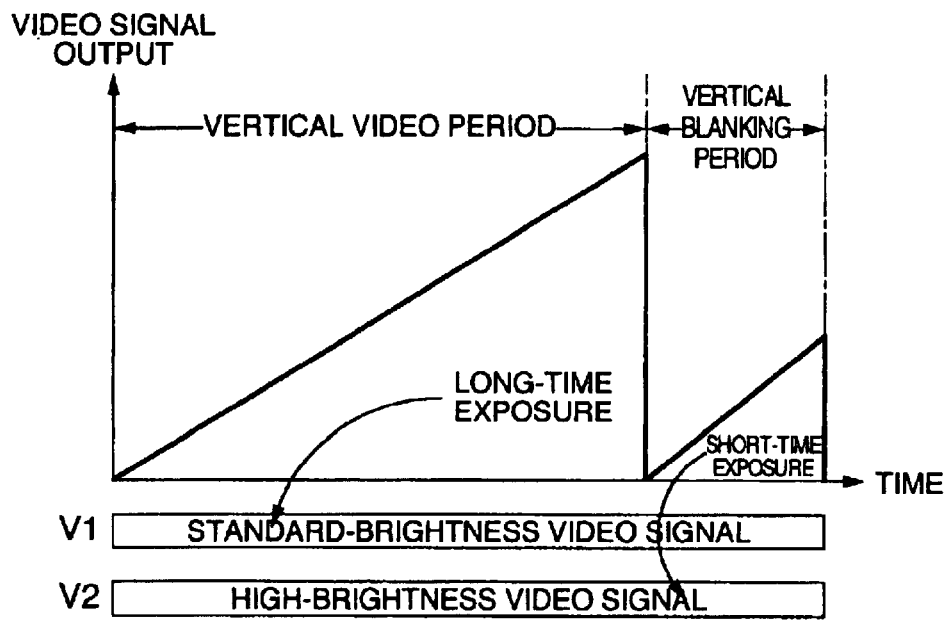
FIG. 7 is a diagram useful for explaining the operation of producing the long-time exposure video signal and short-time exposure video signal from CCD.

Other methods of generating two video signals of different exposure conditions except the process shown in FIG. 7 can be considered: for example, a light beam splitter such as a prism or half-mirror is used to split the light from an object into two beams of light of different amounts which are then received by two imagers; and two imagers having different shutter speeds are used. Those methods are described in U.S. Pat. No. 5,589,880, JP-A-4-354277 and U.S. Pat. No. 5,420,635.

According to the television camera of the invention as described above, even if we shoot a scene including both low-brightness area and high-brightness area of which the color temperatures of light source are different, the low-brightness and high-brightness areas can be individually subjected to white balance process, and thus the wide dynamic range video signal of which both areas are adequately adjusted for good white balance to make the color reproduction excellent can be produced by combining the long-time and short-time exposure video signals of the low-brightness and high-brightness areas.

Figure 10:
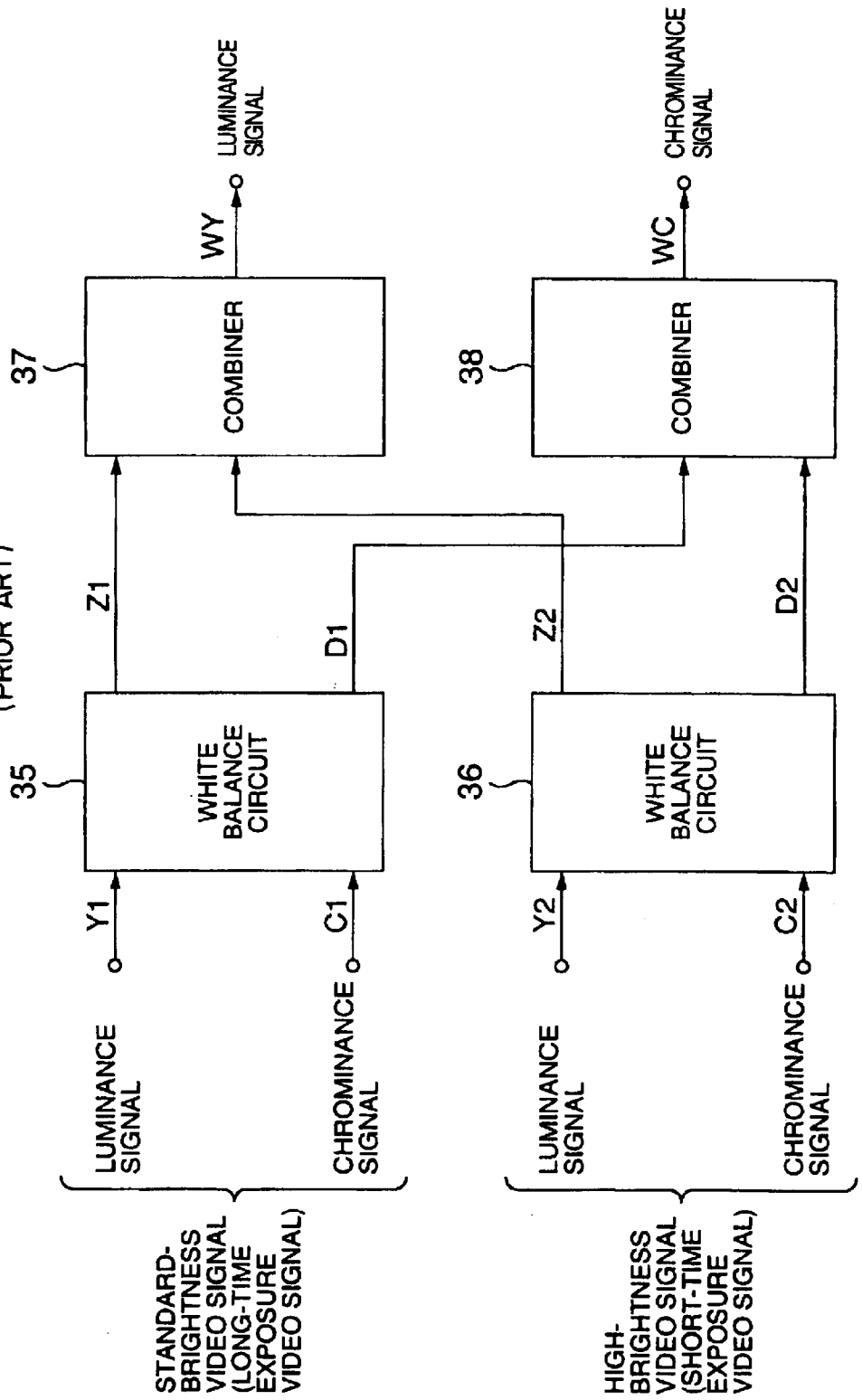
FIG. 10 is a block diagram of a conventional signal combining system for signals subjected to white balance.

An example of signal combining circuit combining a standard brightness video signal with a high-brightness video signal will be described with reference to FIGS. 10, 11 and 12.

A wide dynamic range video signal is generated by use of the standard-brightness video signal and high-brightness video signal derived by the wide dynamic range imager and dual amplification system mentioned with reference to FIGS. 7 and 8. In this case, since the low-brightness image and the high-brightness image are different in their color temperatures, the luminance signal Y1 and chrominance signal C1 of the standard-brightness video signal are supplied to a white balance circuit 35, thus experiencing white balance process, and the luminance signal Y2 and chrominance signal C2 of the high-brightness video signal to a white balance circuit 36, thus being subjected to white balance process, as shown in FIG. 10. The luminance signals Z1, Z2 and chrominance signals D1, D2 result from the white balance processing of the respective video signals of different color temperatures, and supplied to combiners 37 and 38, respectively, where they are combined to produce a luminance WY and a chrominance signal WC that make a wide dynamic range video signal about 64 times as wider.

Figure 11:
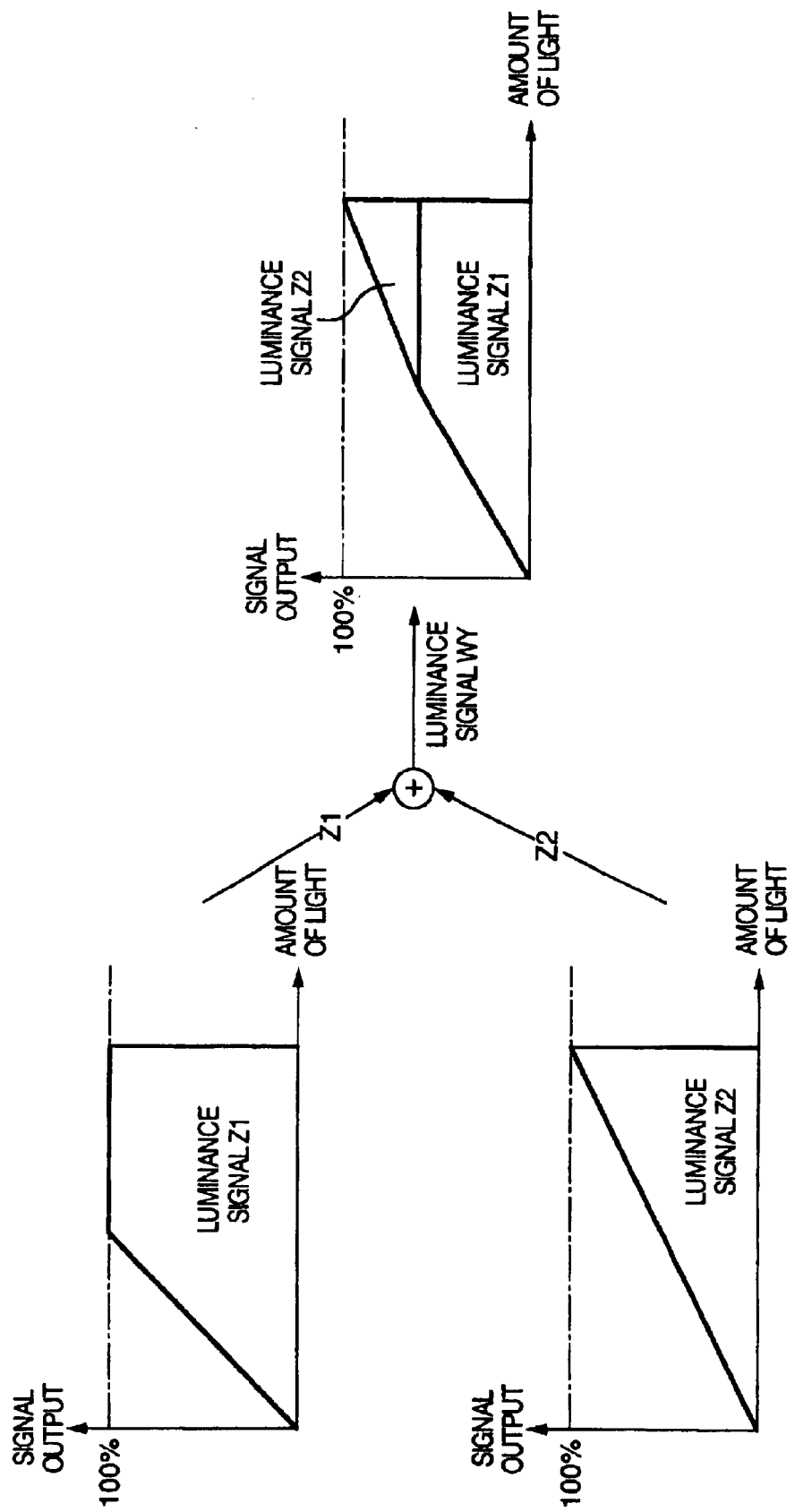
FIG. 11 is a diagram to which reference is made in explaining the signal combining process in an embodiment of the signal processor according to the invention.
Figure 12:
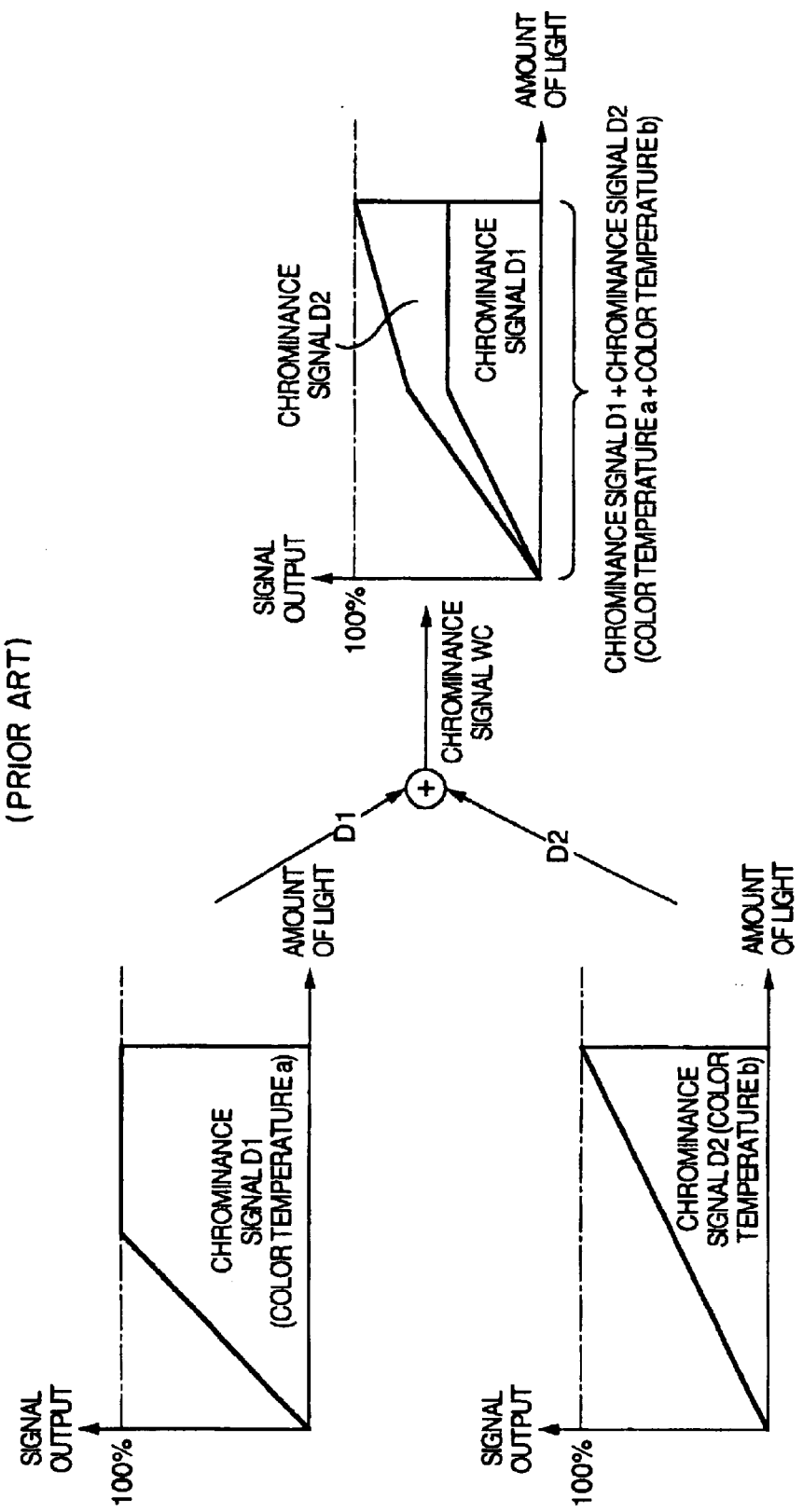
FIG. 12 is a diagram to which reference is made in explaining the conventional combining process for signals subjected to white balance.
Figure 13:
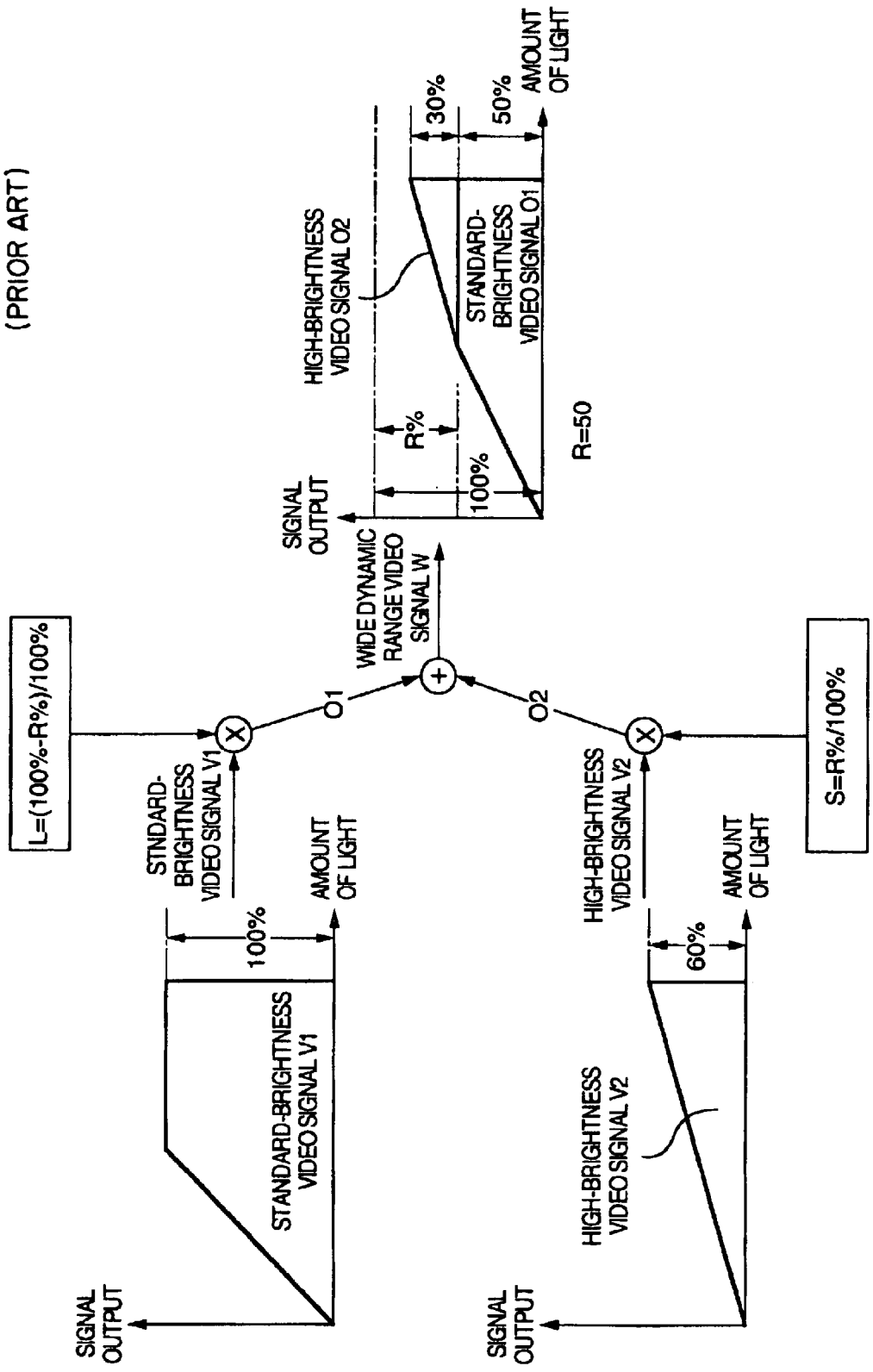
FIG. 13 is a diagram useful for explaining the signal combining process in the conventional wide dynamic range television camera.

In the above luminance combiner, as illustrated in FIG. 11 the luminance signal Z1 of the standard-brightness video signal and the luminance signal Z2 of the high-brightness video signal are combined by the combiner 37 to produce the luminance signal WY. Similarly, the chrominance signal D1 of the standard-brightness video signal and the chrominance signal D2 of the high-brightness video signal are ombined by the combiner 38 to produce the chrominance signal WC as shown in FIG. 12. In this case, if it is assumed that the chrominance signal D1 of the standard-brightness video signal is subjected to white balance process at color temperature a and that the chrominance signal D2 of the high-brightness video signal is subjected to white balance process at color temperature b, the chrominance signal WC of the wide dynamic range video signal results from the combining of the chrominance signals subjected to white balance process at different color temperatures, thus causing a white balance shift problem.

A description will be made of an embodiment of a method for video signal processing according to the invention in which the standard-brightness video signal (long-time exposure video signal) and high-brightness video signal (short-time exposure video signal) can be combined with optimum white balance and with no loss so as to eliminate the problem in signal combining as mentioned above.

Figure 14:
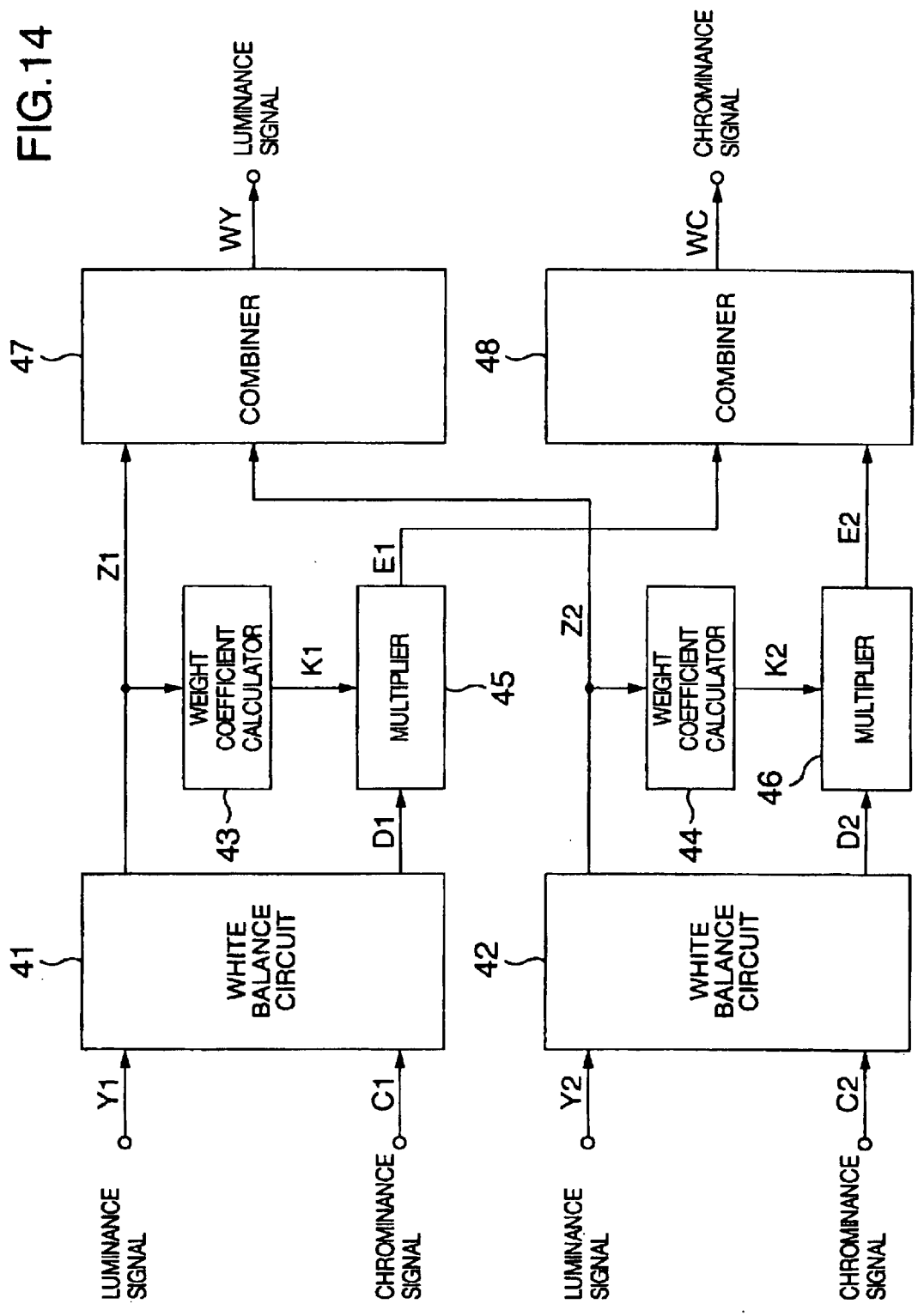
FIG. 14 is a block diagram of a signal combining processor portion of an embodiment of the signal processor according to the invention.

FIG. 14 is a block diagram of the construction of the combining portion in a television camera for generating a wide dynamic range video signal. This combining portion combines a standard-brightness video signal controlled to have an appropriate level by normal-time exposure to light from a standard-bright object, and a high-brightness video signal controlled to have an appropriate level by short-time exposure to light from an extremely bright object. The construction and operation of the combining portion will be described with reference to FIG. 14.

Referring to FIG. 14, there is shown a white balance circuit 41 that adjusts the luminance signal Y1 and chrominance signal C1 of the optimized standard luminance video signal to white balance suitable for the color temperature of the object, and produces the adjusted luminance signal Z1 and chrominance signal D1. Reference numeral 42 represents another white balance circuit that adjusts the luminance signal Y2 and chrominance signal C2 of the optimized high-brightness video signal to white balance suitable for the color temperature of the object, and produces the adjusted luminance signal Z2 and chrominance signal D2. Reference numeral 43 denotes a weight coefficient calculator that calculates a weight coefficient K1 for the chrominance signal D1 on the basis of the brightness level of the luminance signal Z1. Shown at 44 is another weight coefficient calculator that calculates a weight coefficient K2 for the chrominance signal D2 on the basis of the brightness level of the luminance signal Z2. There are also shown a multiplier 45 for multiplying the chrominance signal D1 by the weight coefficient K1 to produce a chrominance signal E1, and another multiplier 46 for multiplying the chrominance signal D2 by the weight coefficient K2 to produce a chrominance signal E2. In addition, shown at 47 is a combining circuit that combines the adjusted luminance signals Z1, Z2 to produce a luminance signal WY as a wide dynamic range video signal, and at 48 is another combining circuit that combines the adjusted chrominance signals E1, E2 to produce a chrominance signal WC as a wide dynamic range video signal.

The operation will be described below.

Figure 15:
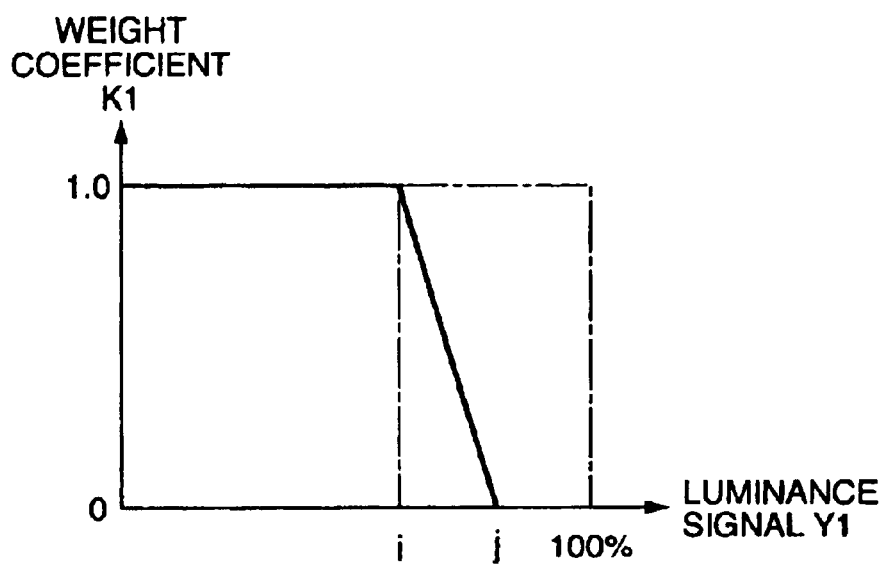
FIG. 15 shows an example of the graph for the weight coefficient in the embodiment of the signal processor according to the invention.

The luminance signal Y1 and chrominance signal C1 of the optimized standard-brightness video signal are supplied to the white balance circuit 41, where white balance adjustment for those signals is made to match the color temperature (here, represented by a) of the object. Then, the white balance circuit 41 produces the luminance signal Z1 and chrominance signal D1. The luminance signal Z1 after white balance adjustment is supplied to the weight coefficient calculator 43, where the weight coefficient K1 is calculated according to the function of, as for example shown in FIG. 15, 1 in the range of brightness level from 0 to i, gradual decrease from 1 to 0 in the range from i to j, and 0 in the range from j to infinite. The weight coefficient K1 calculated by the weight coefficient calculator 43 and the chrominance signal D1 are supplied to the multiplier 45, which then produces the weighted chrominance signal E1 by the calculation of $E1 = K1 \times D1$.

Figure 16:
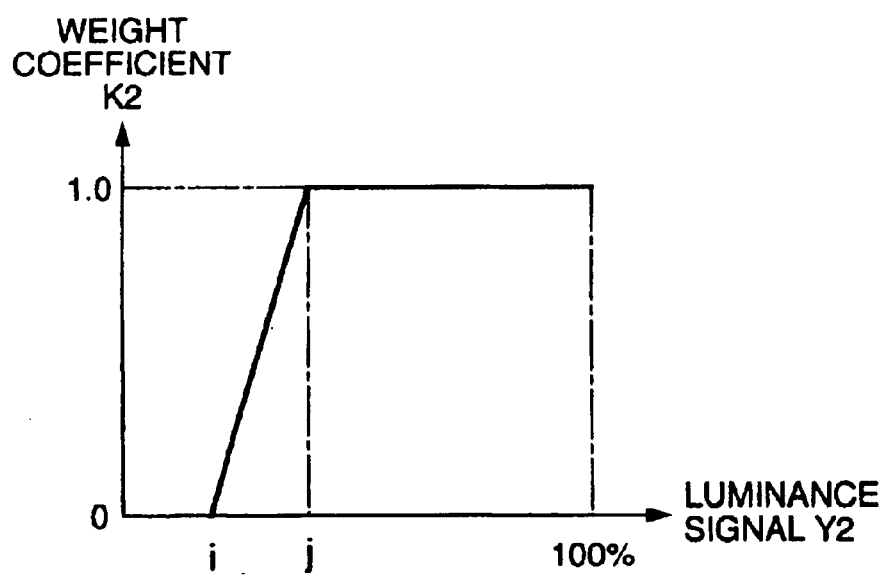
FIG. 16 shows an example of the graph for the weight coefficient in the embodiment of the signal processor according to the invention.

The luminance signal Y2 and chrominance signal C2 of the optimized high-brightness video signal are supplied to the white balance circuit 42, where white balance adjustment is made to match the color temperature (here, represented by b) of the object. Then, it produces the luminance signal Z2 and chrominance signal D2. The luminance signal Z2 after white balance adjustment is supplied to the weight coefficient calculator 44, where the weight coefficient K2 is calculated according to the function of, as for example shown in FIG. 16, 0 in the range of brightness level from 0 to i, gradual increase from 0 to 1 in the range from i to j, and 1 in the range from j to infinite. The weight coefficient K2 calculated by the weight coefficient calculator 44, and the chrominance signal D2 are supplied to the multiplier 46, which then produces the weighted chrominance E2 by the calculation of $E2 = K2 \times D2$.

The luminance signals Z1, Z2 that experienced white balance process are supplied to the combining circuit 47, and combined thereby as shown in FIG. 11 to produce the luminance signal WY as a wide dynamic range video signal.

Figure 17:
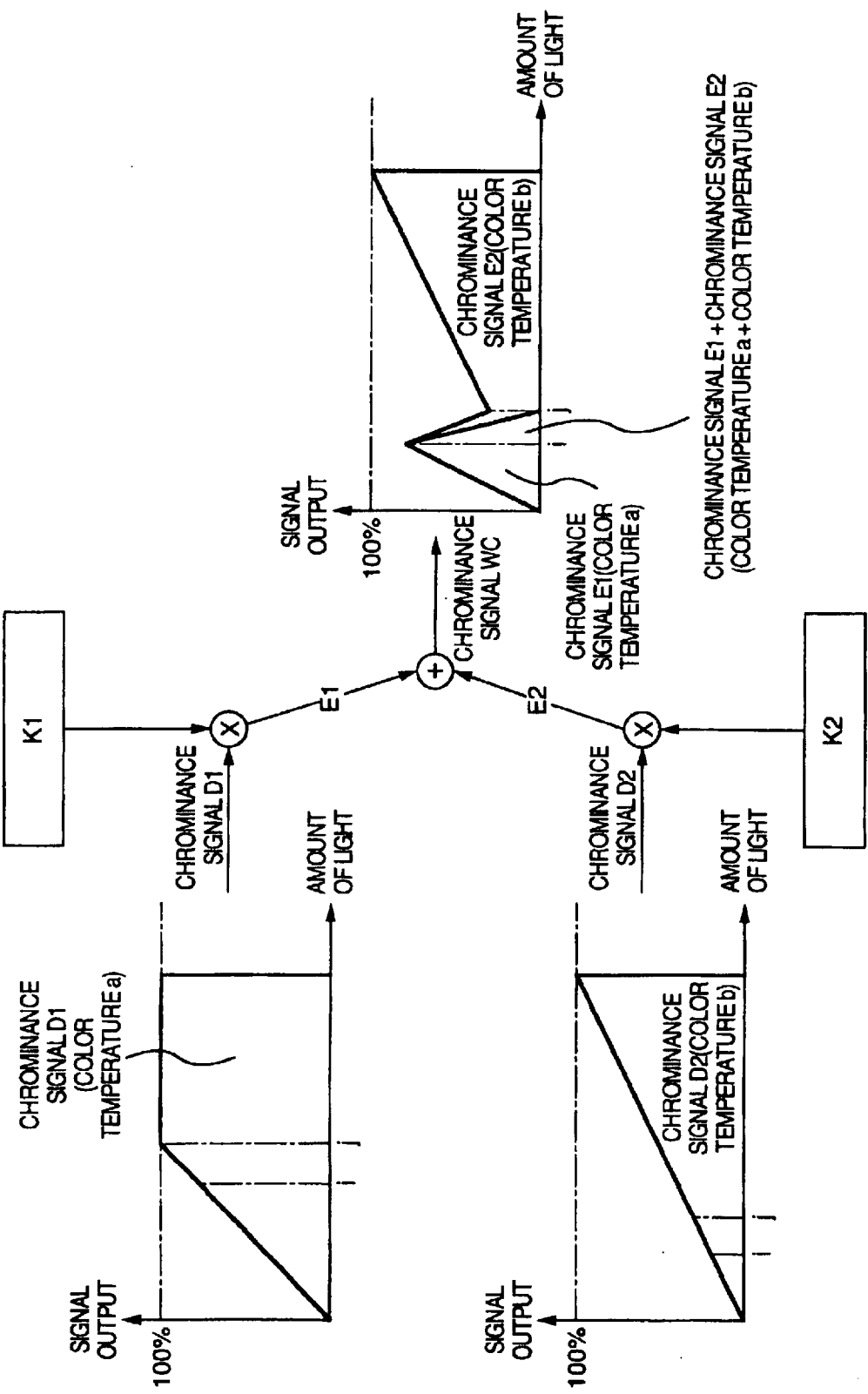
FIG. 17 is a diagram to which reference is made in explaining the signal combining process in the embodiment of the signal processor according to the invention.

Similarly, the chrominance signals E1, E2 after knee process are supplied to the combining circuit 48, and combined thereby as shown in FIG. 17 to produce the chrominance signal WC as a wide dynamic range video signal.

Figure 18:
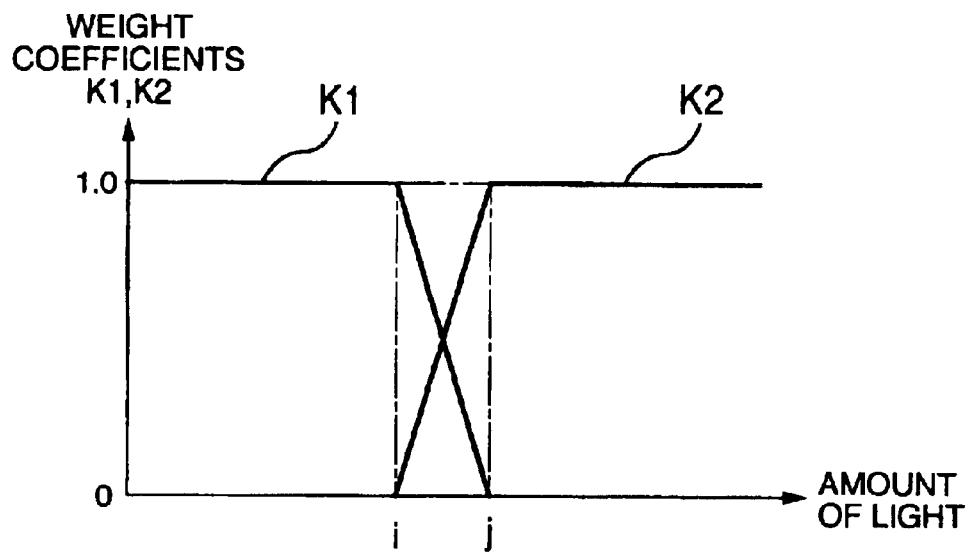
FIG. 18 is an example of the graph for the combined weight coefficient in the embodiment of the signal processor according to the invention.

As describe above, the weight coefficients K1, K2 by which the chrominance signals D1, D2 are multiplied take the intersecting characteristics between the levels i and j that provide the same amount of light (brightness level) as shown in FIG. 18. Therefore, as shown in FIG. 17, the chrominance signal WC after combining has only the chrominance signal E1 of standard-brightness video signal in the range from 0 to i, namely, only the signal processed on the basis of color temperature a. In the range from level i to j, the chrominance signal E2 of high-brightness video signal is combined with the chrominance signal E1 of standard-brightness video signal while the proportion of the chrominance signal E2 is being gradually increased. In the range from level j to infinity, it has only the chrominance signal E2 of the high-brightness video signal, or only the signal processed on the basis of color temperature b.

Thus, the deviation out of white balance is confined within the minimum range from level i to j, and the boundary region in which the chrominance signals E1, E2 are combined is smoothly processed. This fact makes it possible to provide a video signal having a wide dynamic range and optimum white balance.

According to the above embodiment, the video signal resulting from combining the standard-brightness object and the high-brightness object can be obtained with no loss and with optimum white balance, or a wide dynamic range video signal can be generated.

A description will be made of another embodiment of a video signal processing method and apparatus according to the invention in which the standard brightness video signal (long-time exposure video signal) and high-brightness video signal (short-time exposure video signal) can be combined at optimum levels without loss.

FIG. 19 is a block diagram of another embodiment of the combining portion of a television camera that combines the standard-brightness video signal controlled to have an appropriate level by normal-time exposure to light from a standard-bright object, and a high-brightness video signal controlled to have an appropriate level by short-time exposure to light from an extremely bright object, thereby producing a wide dynamic range video signal. The construction and operation of another embodiment of the combining portion will be described with reference to FIG. 19.

Referring to FIG. 19, V1 is the standard-brightness video signal derived to have an appropriate level by proper exposure to light from a standard-brightness object, V2 the high-brightness video signal derived to have an appropriate level by proper exposure to light from a high-brightness object, R the combining ratio for controlling the maximum proportion of the high-brightness video signal V2 in the wide dynamic range video signal W after combining, P the peak value of the high-brightness video signal V2, L the multiplication factor by which the standard-brightness video signal V1 is multiplied, S the multiplication factor by which the high-brightness video signal V2 is multiplied, 01 the standard-brightness video signal resulting from multiplying the standard-brightness video signal V1 by the multiplication factor L, 02 the high-brightness video signal resulting from multiplying the high-brightness video signal V2 by the multiplication factor S, and W the wide dynamic range video signal resulting from combining the standard-brightness video signal 01 and the high-brightness video signal 02.

In addition, 51 denotes the peak detector for detecting, for example, the peak value P of the high-brightness video signal V2 in one field period, 52 the multiplication factor calculator for calculating the multiplication factor L for the standard-brightness video signal V1 and the multiplication factor S for the high-brightness video signal V2 according to the combining ratio R and peak value P, 53 the multiplier for multiplying the standard-brightness video signal V1 by the factor L to produce the standard-brightness video signal 01, 54 the multiplier for multiplying the high-brightness video signal V2 by the factor S to produce the high-brightness video signal 02, and 55 the combining circuit for combining the standard-brightness video signal 01 and the high-brightness video signal 02 to produce the wide dynamic range video signal W.

The operation of the combining portion of FIG. 19 will be described.

The high-brightness video signal V2 is supplied to the peak detector 51 where the peak value P of the signal V2 is detected. The combining ratio R and the peak value P are supplied to the multiplication factor calculator 52.

Figure 20:
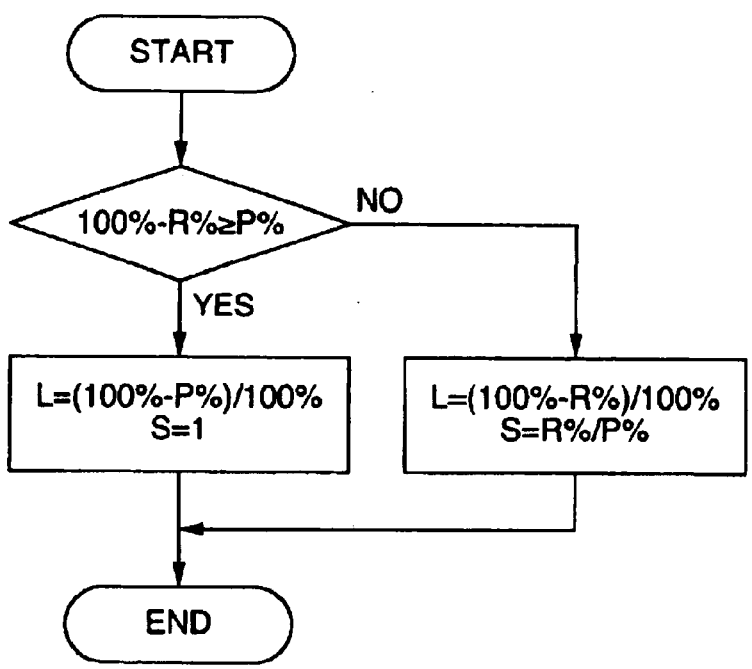
FIG. 20 is a flowchart to which reference is made in explaining the operation of the multiplication factor circuit in the embodiment of FIG. 19 of the signal processor according to the invention.

The multiplication factor calculator 52 compares the peak value P with the subtraction of the combined ratio R% from the maximum amplitude 100% of the video signal as shown in FIG. 20. If 100%−R%≧P%, the multiplication factor calculator 52 produces (100%−P%)/100% as factor L and 1 as factor S. If 100%−R%<P%, it produces (100%−P%)/100% as factor L and R%/P% as factor S.

The multiplication factor calculator 52 supplies the factor L to the multiplier 53 and the factor S to the multiplier 54. The multiplier 53 multiplies the standard-brightness video signal V1 by the factor L to produce the standard-brightness video signal 01. Similarly, the multiplier 54 multiplies the high-brightness video signal V2 by the factor S to produce the high-brightness video signal 02.

The standard-brightness video signal 01 and high-brightness video signal 02 are combined by the combining circuit 55 to produce the wide dynamic range video signal W.

Thus, as shown in FIG. 21, when the peak value P is equal to or smaller than 100%−R%, the high-brightness video signal V2 is multiplied by factor S of 1 in order not to be attenuated, and combined at a rate of P% in the wide dynamic range video signal W. The remaining 100%−P% is assigned to the standard-brightness video signal V1, or the standard-brightness video signal V1 is multiplied by factor L of (100%−P%)/100%, so that the wide dynamic range video signal W can keep the amplitude level at 100%.

As shown in FIG. 22, if the peak value P is larger than 100%−R%, the standard-brightness video signal V1 is multiplied by factor L of (100%−R%)/100%, and combined at a rate of 100%−R% in the wide dynamic range video signal W. The remaining R% is assigned to the high-brightness video signal V2, or the high-brightness video signal V2 is multiplied by factor S of R%/P%, so that the wide dynamic range video signal W can keep the amplitude level at 100%. Accordingly, even though the high-brightness video signal V2 has any amplitude level, the wide dynamic range video signal W always has 100% amplitude.

According to this embodiment, the wide dynamic range video signal resulting from combining the standard-brightness video signal and the high-brightness video signal can have the optimum level without loss and a wide dynamic range.

A description will be made of another embodiment of a video signal processing method and apparatus according to the invention in which the standard-brightness video signal (long-time exposure video signal) and the high-brightness video signal (short-time exposure video signal) can be combined at optimum levels without loss.

Figure 23:
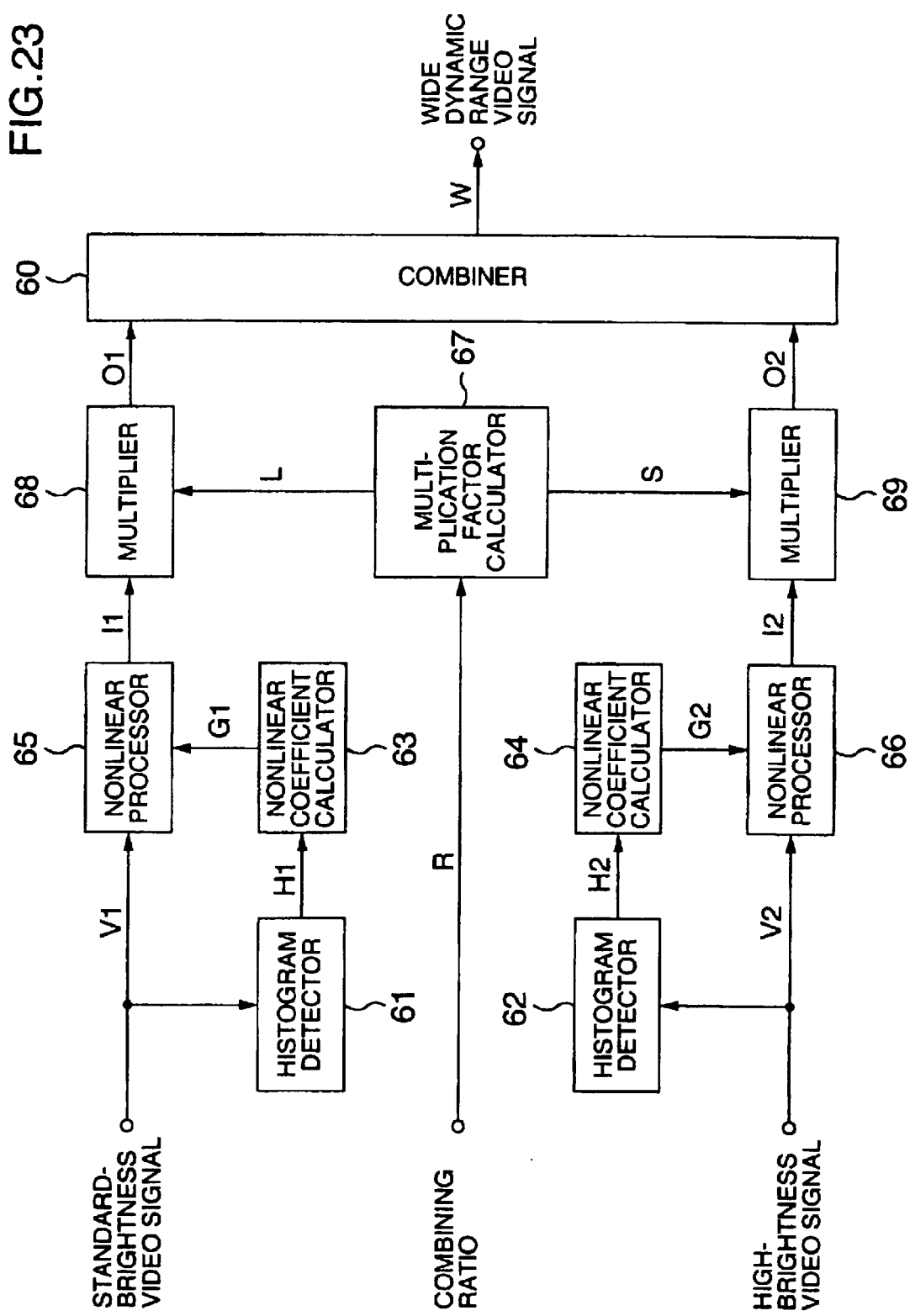
FIG. 23 is a block diagram of the signal combining process portion in still another embodiment of the signal processor according to the invention.

FIG. 23 is a block diagram of another embodiment of the combining portion of a television camera according to the invention that combines the standard-brightness video signal controlled to have an appropriate level by normal-time exposure to light from a standard-bright object, and the high-brightness video signal controlled to have an appropriate level by short-time exposure to light from an extremely bright object, thereby producing a wide dynamic range video signal. The construction and operation of another embodiment of the combining portion will be described with reference to FIG. 23.

Referring to FIG. 23, 61 represents a histogram detector for detecting a histogram signal H1 from the standard-brightness video signal V1 derived to have an appropriate level by proper exposure to light from a standard-brightness object, and 62 another histogram detector for detecting a histogram signal H2 from the high-brightness video signal V2 derived to have an appropriate level by proper exposure to light from a high-brightness object. In addition, 63 is a nonlinear coefficient calculator for calculating from the histogram signal H1 a nonlinear coefficient G1 for use in nonlinear process of the standard-brightness video signal V1, and 64 a nonlinear coefficient calculator for calculating from the histogram signal H2 a nonlinear coefficient G2 for use in nonlinear process of the high-brightness video signal V2. Also, 65 denotes a nonlinear processor for nonlinear-processing the standard-brightness video signal V1 by use of the nonlinear coefficient G1 to produce a standard-brightness video signal I1, and 66 a nonlinear processor for nonlinear-processing the high-brightness video signal V2 by use of the nonlinear coefficient G2 to produce a high-brightness video signal I2. Moreover, 67 is a multiplication coefficient calculator for calculating the multiplication factor L for the standard-brightness video signal I1 and the multiplication factor S for the high-brightness video signal I2 on the basis of the combining ratio R that determines the maximum proportion of the high-brightness video signal V2 in the wide dynamic range video signal W. Reference numeral 68 represents a multiplier for multiplying the standard-brightness video signal I1 by factor L to produce the standard-brightness video signal 01, 69 another multiplier for multiplying the high-brightness video signal I2 by factor S to produce the high-brightness video signal 02, and 60 a combining circuit for combining the standard-brightness video signal 01 and the high-brightness video signal 02 to produce the wide dynamic range video signal W.

Figure 24:
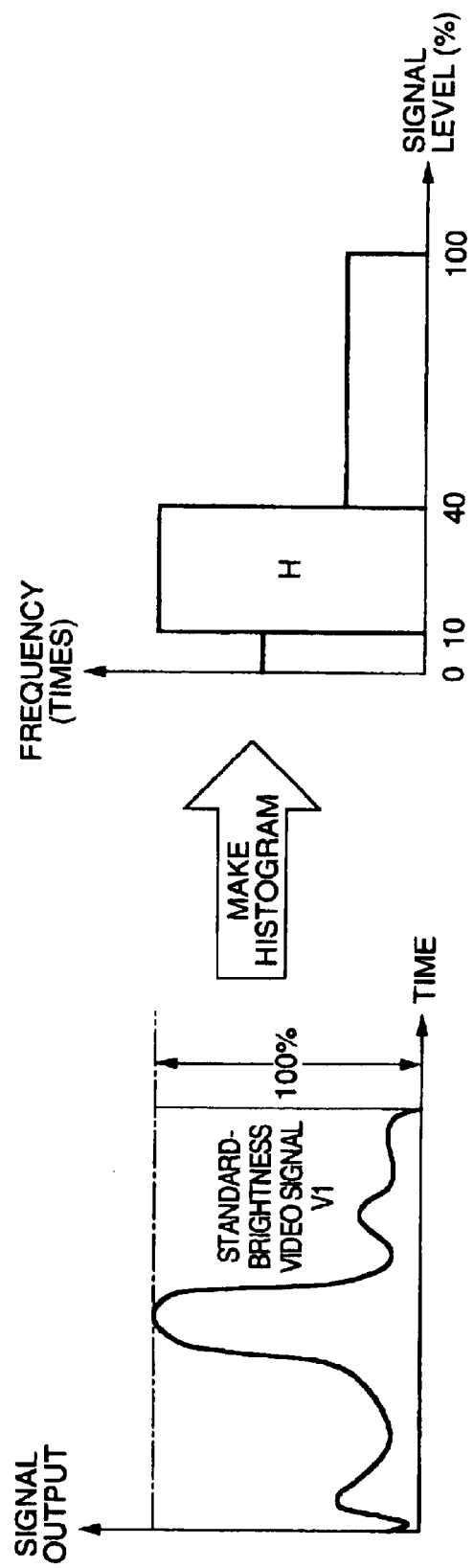
FIG. 24 is a diagram useful for explaining the operation of the histogram detector in FIG. 23.

The case in which gamma process is used as nonlinear process will be described. First, the standard-brightness video signal V1 is supplied to the histogram detector 61, which then detects the histogram value H1 of signal V1. The histogram value H1 indicates, as for example shown in FIG. 24, how many times signal levels of 10~40% occur in one field of the standard-brightness video signal V1, or how many pixels of 10~40% levels it has. While the histogram value is in the range of 10~40% levels that are important for the gamma process, it is not limited to this range. In addition, while the histogram is here obtained from a particular range, it can be acquired from a fine histogram correlation.

Figure 25:
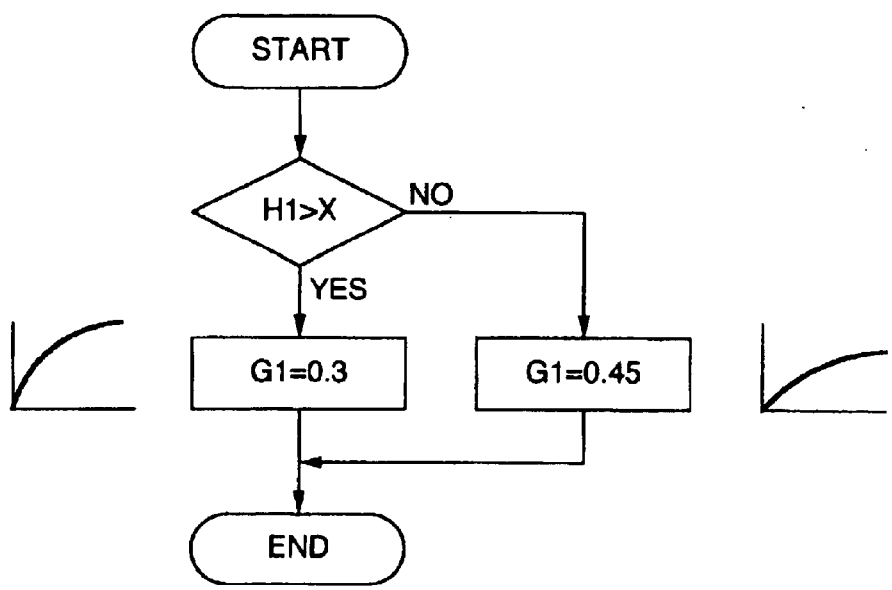
FIG. 25 is a diagram useful for explaining the operation of the nonlinear processor in FIG. 23.

The histogram value H1 from the histogram detector 61 is supplied to the nonlinear coefficient calculator 63, where gamma coefficient G1 of, for example, 0.3 is produced if the histogram value H1 is larger than a predetermined value X, or gamma coefficient G1 of, for example, 0.45 (standard) is produced if it is smaller than the value X as shown in FIG. 25. In other words, when a signal portion (total number of pixels) that exist in a particular range of levels exceeds a predetermined value, the gamma coefficient G1 is controlled to decrease. This means that the gamma coefficient G1 is controlled to a proper value in order that the signal portion of which the levels much exist in one picture frame can have a large level.

Figure 27:
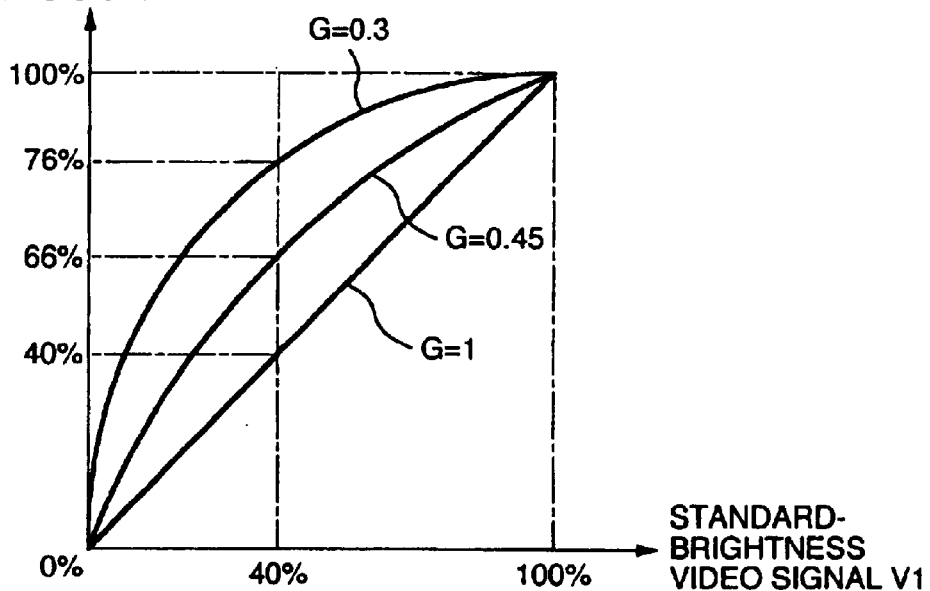
FIG. 27 is a graph for the nonlinear processor in FIG. 23.

While two values, 0.3 and 0.45, of the gamma coefficient G1 are used here as shown in FIG. 27, the gamma coefficient can be selected from a table of many values.

Figure 26:
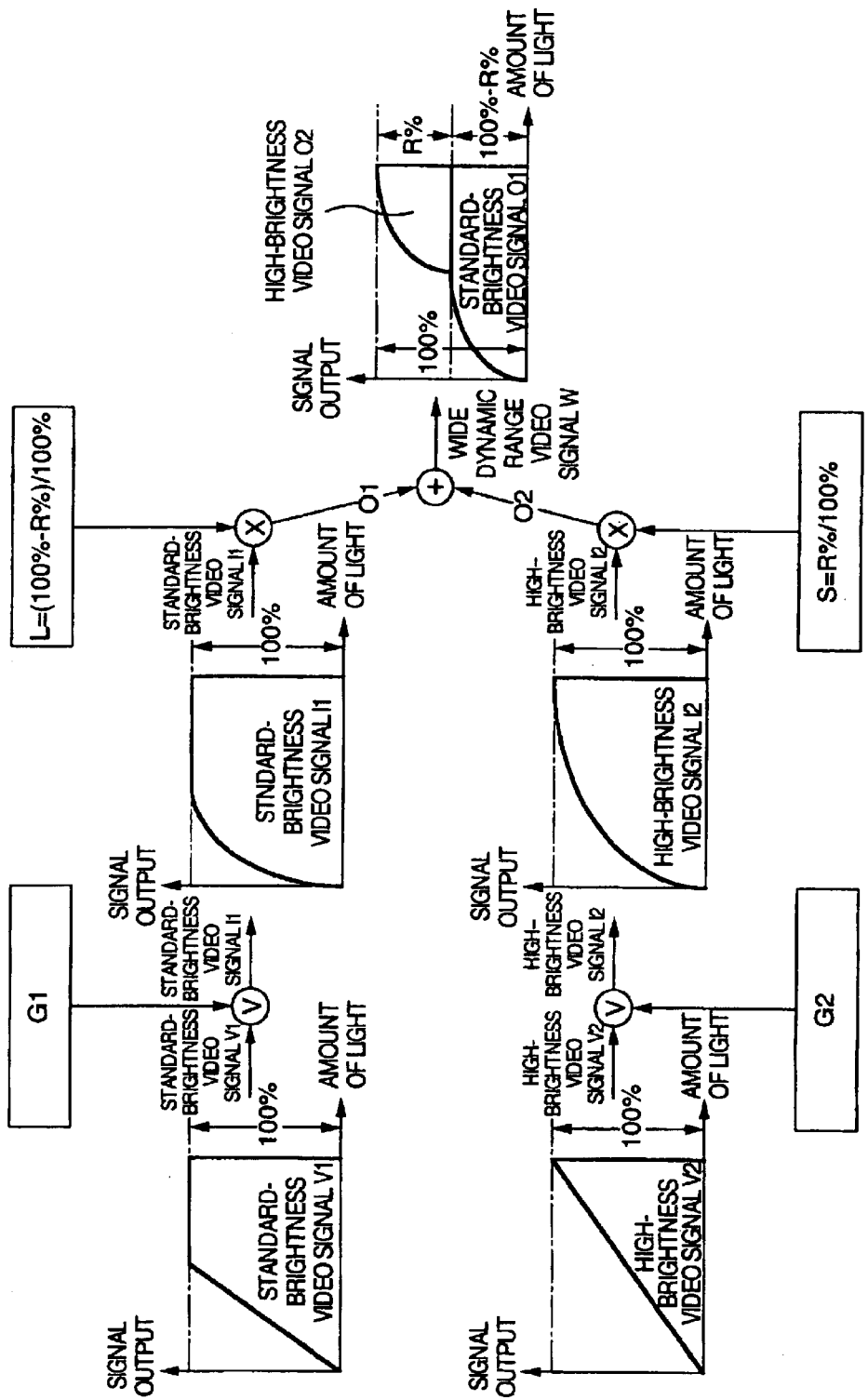
FIG. 26 is a diagram useful for explaining the signal combining process in the signal processor in FIG. 23.

The correct gamma coefficient G1 from the nonlinear coefficient calculator 63 is supplied to the nonlinear processor 65, where gamma process ($I1=V1^{G1}$) is performed on the standard-brightness video signal V1 according to the gamma coefficient G1 to produce the gamma-corrected standard-brightness video signal I1 as shown in FIG. 26.

If the standard-brightness video signal V1 has a level of 40%, the standard-brightness video signal I1 has a level of 66% at G1=0.45, and a level of 76% at G1=0.3. In other words, as the gamma coefficient G1 decreases, the signal more shifts to the low-brightness level side tone, thus increasing the contrast.

The high-brightness video signal V2 is supplied to the histogram detector 62 as is the standard-brightness video signal V1. It detects the histogram value H2 of a certain level range from the high-brightness video signal V2.

The histogram value H2 from the histogram detector 62 is supplied to the nonlinear coefficient calculator 64, where the gamma coefficient G2 is correctly calculated from the histogram value H2.

The gamma coefficient G2 from the nonlinear coefficient calculator 64 is supplied to the nonlinear processor 66, where gamma process ($I2=V2^{G2}$) is carried out on the high-brightness video signal V2 according to the gamma coefficient G2 to produce the gamma-corrected high-brightness video signal I2 as shown in FIG. 26.

The multiplication factor calculator 67 calculates and produces multiplication factor L of (100%−R%)/100% and multiplication factor S of R%/100% on the basis of the input combining ratio R.

The multiplication factors L and S from the multiplication factor calculator 67 are supplied to the multipliers 68 and 69, respectively. The multiplier 68 multiplies the standard-brightness video signal I1 by factor L to produce the standard-brightness video signal 01. Similarly, the multiplier 69 multiplies the high-brightness video signal I2 by factor S to produce the high-brightness video signal 02.

The standard-brightness video signal 01 and high-brightness video signal 02 are combined by the combining circuit 60 to produce the wide dynamic range video signal W.

Thus, the standard-brightness and high-brightness video signals are respectively gamma-processed with the gamma coefficients changed according to the histograms for predetermined ranges of levels of the video signals, and combined to produce a wide dynamic range video signal with the standard-brightness and high-brightness video signals of optimum levels.

Figure 28:
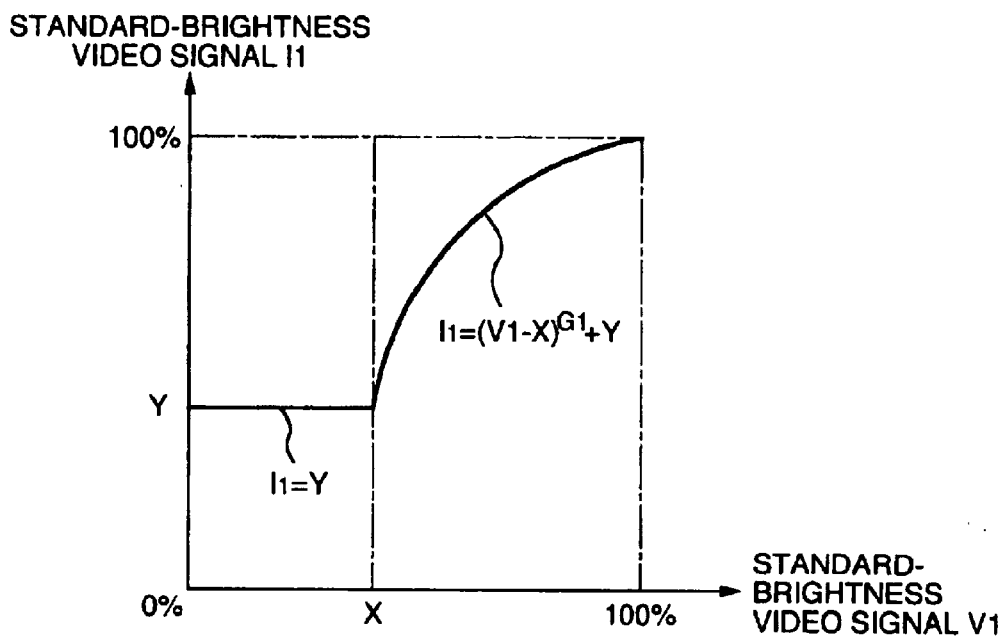
FIG. 28 is a graph for the nonlinear processor in FIG. 23.

While gamma process is used as nonlinear process in the above embodiment, the present invention may use a combination of linear process and gamma process as shown in FIG. 28 to calculate the standard-brightness video signal I1 from the following equations.

When $$V1 \leq X$$

$$I1 = Y$$

When $$V1 > X,$$

$$I1 = (V1-X)^{G1} + Y$$

Figure 29:
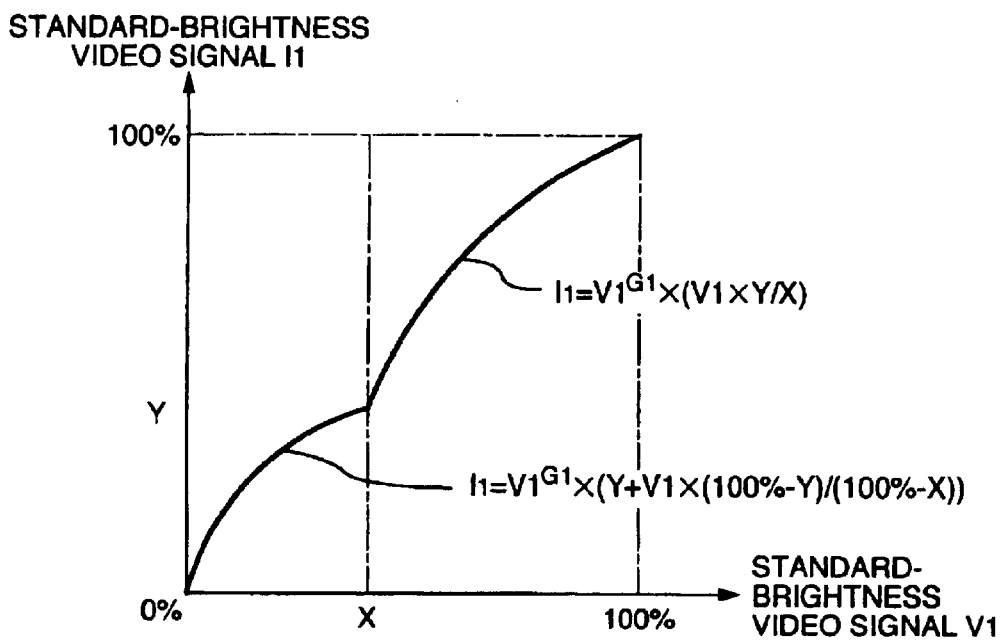
FIG. 29 is a graph for the nonlinear processor in FIG. 23.

In addition, as shown in FIG. 29, a combination of a plurality of gamma processes may be used to make calculation of the standard-brightness video signal I1 from the following equations.

When $$V1 \leq X,$$

$$I1 = V1^{G1} \times (V1 \times Y/X)$$

When $$V1 > X,$$

$$I1 = V1^{G1} \times (Y + V1 \times (100\% - Y)/(100\% - X))$$

where,

V1 is a standard-brightness video signal inputted to nonlinear coefficient calculator 65, I1 is a standard-brightness video signal outputted from nonlinear coefficient calculator 65, X and Y are changing points on nonlinear characteristic curves shown in FIGS. 28 and 29, and G1 is a gamma coefficient in a range of 0–1 of nonlinear characteristic curve.

By these different nonlinear processes it is possible to increase the degrees of tone for the video signals of desired ranges of levels, and further raise the contrast of the standard-brightness video signal.

As described above, by combining the standard-brightness and high-brightness video signals after being subjected to nonlinear process with the nonlinear coefficients changed according to the histograms of certain ranges of levels of the video signals, it is possible to produce a wide dynamic range video signal with the standard-brightness and high-brightness video signals of optimum levels.

According to the invention, by combining the standard-brightness and high-brightness video signals after being subjected to nonlinear process with the nonlinear coefficients changed according to the histograms of certain ranges of levels of the video signals, it is possible to produce a wide dynamic range video signal without loss and with optimum level.

A description will be made of still another embodiment of a video signal processing method and apparatus according to the invention that can combine the standard-brightness video signal (long-time exposure video signal) and the high-brightness video signal (short-time exposure video signal) without loss and with optimum levels of those video signals.

Figure 30:
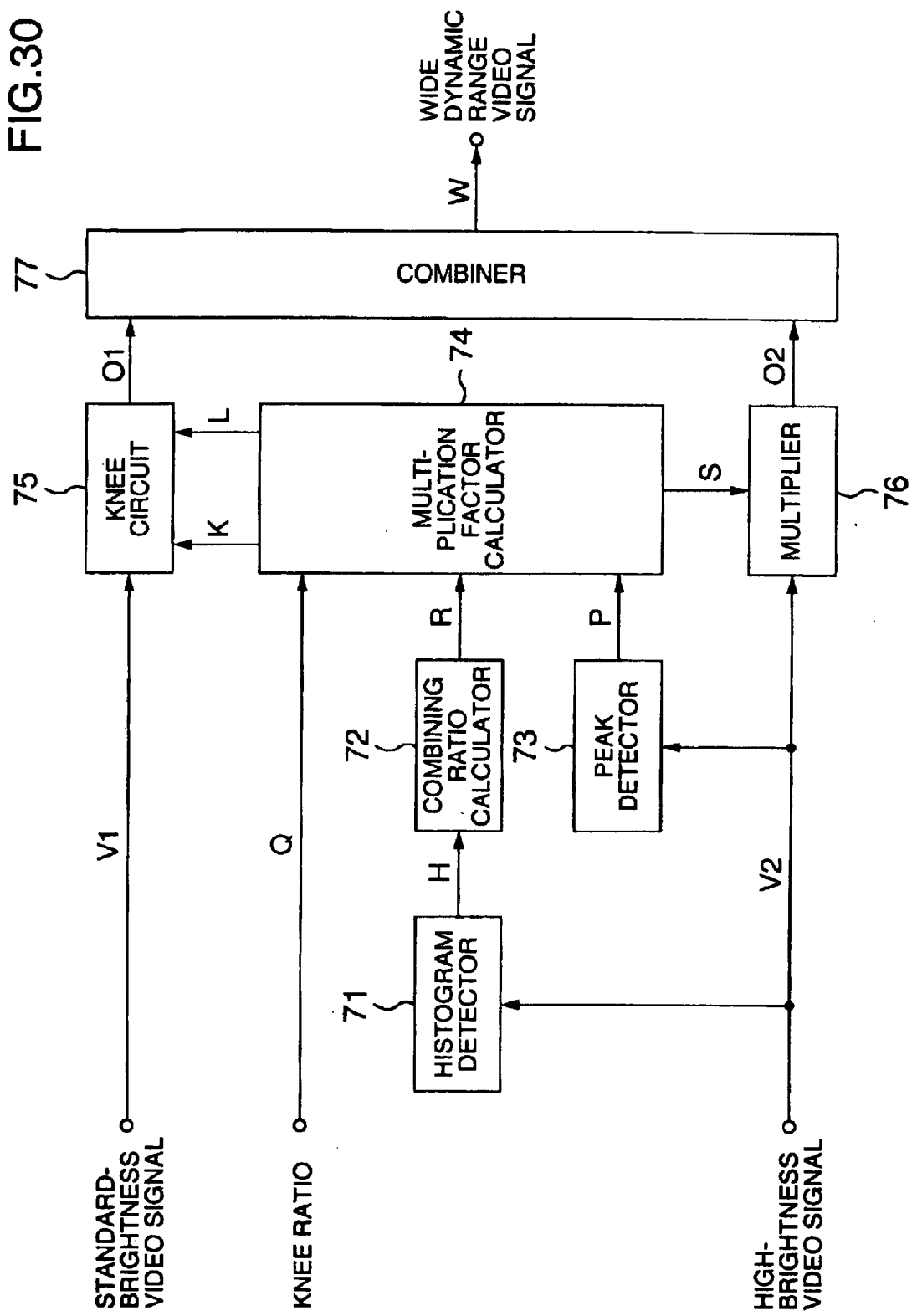
FIG. 30 is a block diagram of the signal combining process portion in still further embodiment of the signal processor according to the invention.

FIG. 30 is a block diagram of the combining portion of a television camera which combines the standard-brightness video signal controlled to have an appropriate level by normal exposure to light from a standard-brightness object, and the high-brightness video signal controlled to have an appropriate level by short-time exposure to light from an extremely bright object to produce a wide dynamic range video signal. The construction and operation will be described with reference to FIG. 30.

Referring to FIG. 30, 71 is a histogram detector for detecting a histogram signal H from the high-brightness video signal V2 that is generated to have an appropriate level by exposure to light from a high-brightness object, 72 a combining ratio calculator for calculating the combining ratio R by which the maximum proportion of the high-brightness video signal V2 in the wide dynamic range video signal W is determined from the histogram signal H, and 73 a peak detector for detecting the peak value P in, for example, one field of the high-brightness video signal V2. In addition, 74 represents a multiplication coefficient calculator for calculating a knee point K and knee coefficient L of the standard-brightness video signal V1 and the multiplication factor S of the high-brightness video signal V2 on the basis of the combining ratio R, the peak value P and a knee ratio Q for controlling the proportion of the standard-brightness video signal V1 of which the levels are above knee point K in the wide dynamic range video signal. Also, 75 is a knee circuit for processing the standard-brightness video signal V1 according to the knee point K and knee coefficient L to produce the standard-brightness video signal 01, 76 a multiplier for multiplying the high-brightness video signal V2 by factor S to produce the high-brightness video signal 02, and 77 a combining circuit for combining the standard-brightness video signal 01 and high-brightness video signal 02 to produce the wide dynamic range video signal W.

The operation will be described below.

Figure 31:
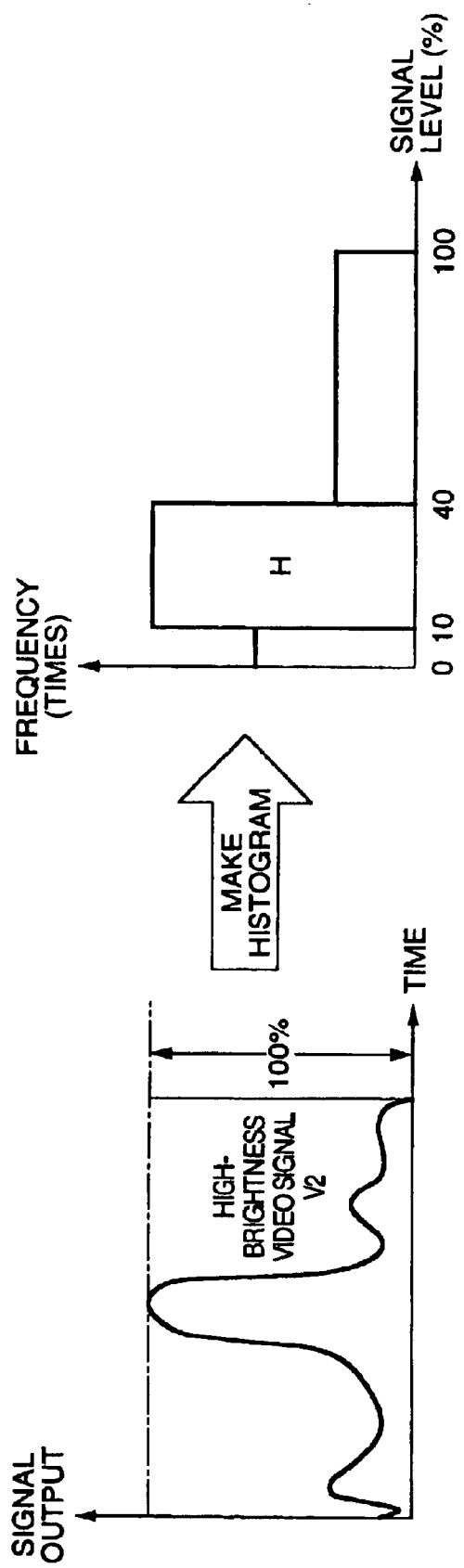
FIG. 31 is a diagram useful for explaining the operation of the histogram detector in FIG. 30.

First, the high-brightness video signal V2 is supplied to the histogram detector 71, which then produces the histogram value H of the high-brightness video signal V2. The histogram value H indicates how many times the signal levels of, for example, 10~40% occur in the high-brightness video signal V2 of one field, or how many pixels of 10~40% are included therein as shown in FIG. 31. While the histogram value is here detected for 10~40% levels that are important in the knee process, it is not limited to this level range. In addition, while the histogram is here obtained from a particular range, it may be acquired from a detailed histogram function.

Figure 32:
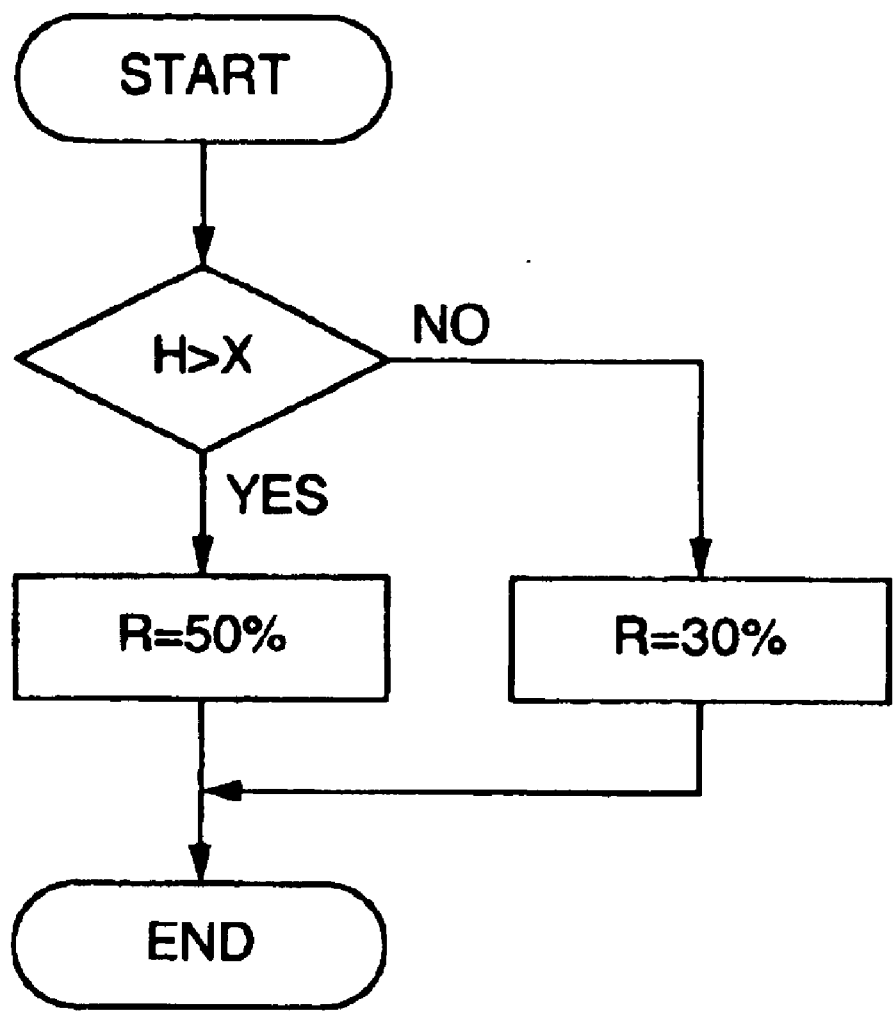
FIG. 32 is a flowchart for the operation of the combining ratio calculator in FIG. 30.

The histogram value H from the histogram detector 71 is supplied to the combining ratio calculator 72 where, as shown in FIG. 32, the combining ratio R of 50% or 30% is produced depending on whether the histogram value H is larger than or smaller than a certain value X, respectively. In other words, when a signal portion of a particular range of levels (total number of pixels) exceeds a predetermined value, the combining ratio R is controlled to increase, or the combining ratio R is controlled to a proper value in order that a signal portion of which the levels much exist in one picture frame can have a high level. While the combining ratio R is here used as two different values of 30% and 50%, it may be selected from a table of many different values.

In addition, the high-brightness video signal V2 is supplied to the peak detector 73, which then generates the peak value P of the video signal V2. The combining ratio R, peak value P and knee ratio Q are supplied to the multiplication coefficient calculator 74.

Figure 33:
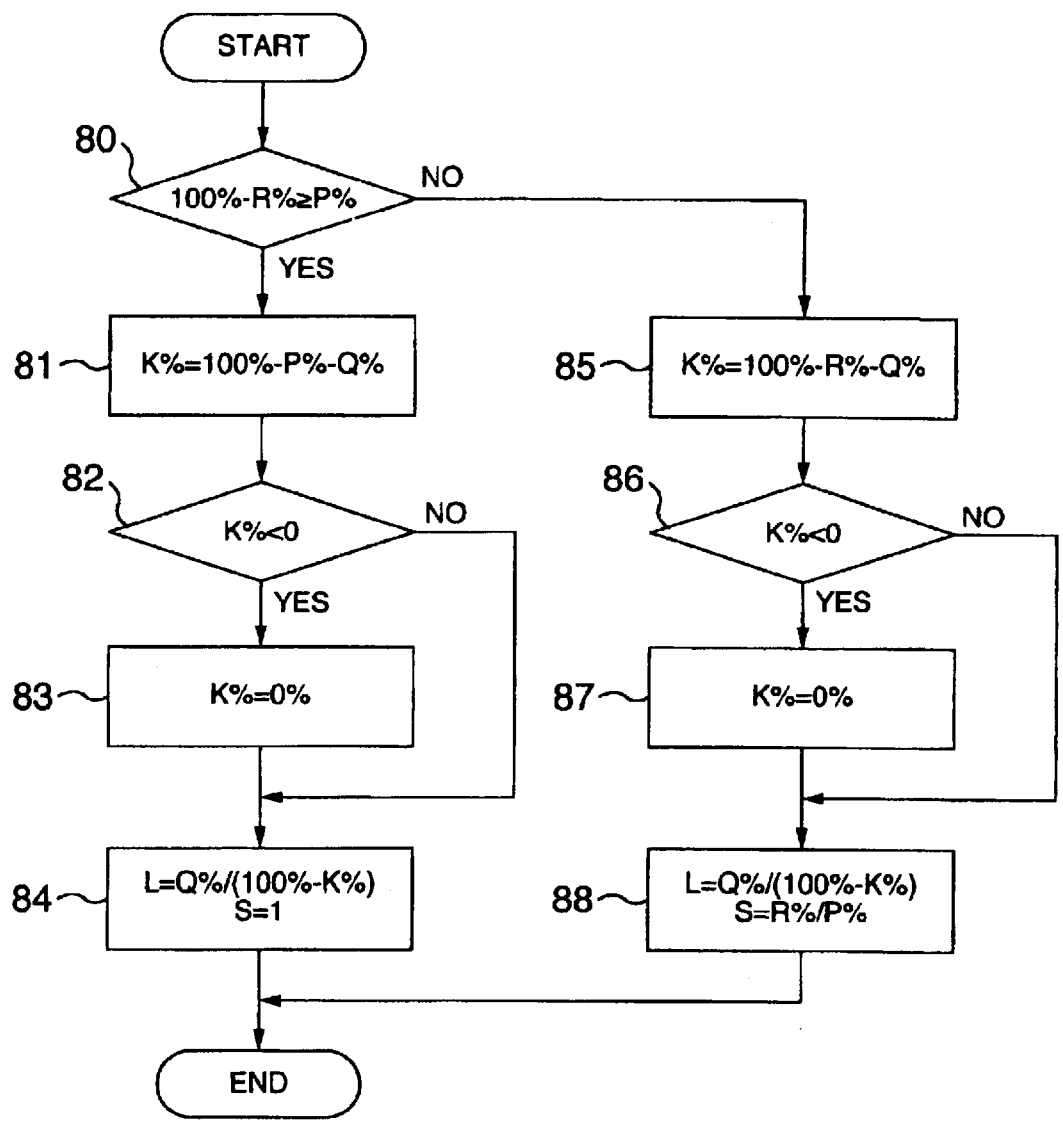
FIG. 33 is a flowchart for the operation of the multiplication factor calculator in FIG. 30.

The multiplication coefficient calculator 74, as illustrated in the flowchart of FIG. 33, compares the peak value P and the subtraction of combining ratio R from the maximum amplitude 100% of the video signal (at step 80). If 100%−R%≧P%, the knee point K is selected as 100%−P%−Q% (when K is minus, K=0), the knee coefficient L as Q%/(100%−K%), and the 15 multiplication factor S as 1 (steps 81~84). If 100%−R%<P%, the knee point K is selected as 100%−R%−Q% (when K is minus, K=0), the multiplication factor L as Q%/(100%−K%), and multiplication factor S as R%/P% (steps 85~88).

The knee point K and knee coefficient L from the multiplication coefficient calculator 74 are supplied to the knee circuit 75. The knee circuit 75 makes knee process of the standard-brightness video signal V1 on the basis of the knee point K and knee coefficient L, and generates the standard-brightness video signal 01. The multiplication factor S is supplied to the multiplier 76, which then multiplies the high-brightness video signal V2 by factor S to produce the high-brightness video signal 02.

Figure 34:
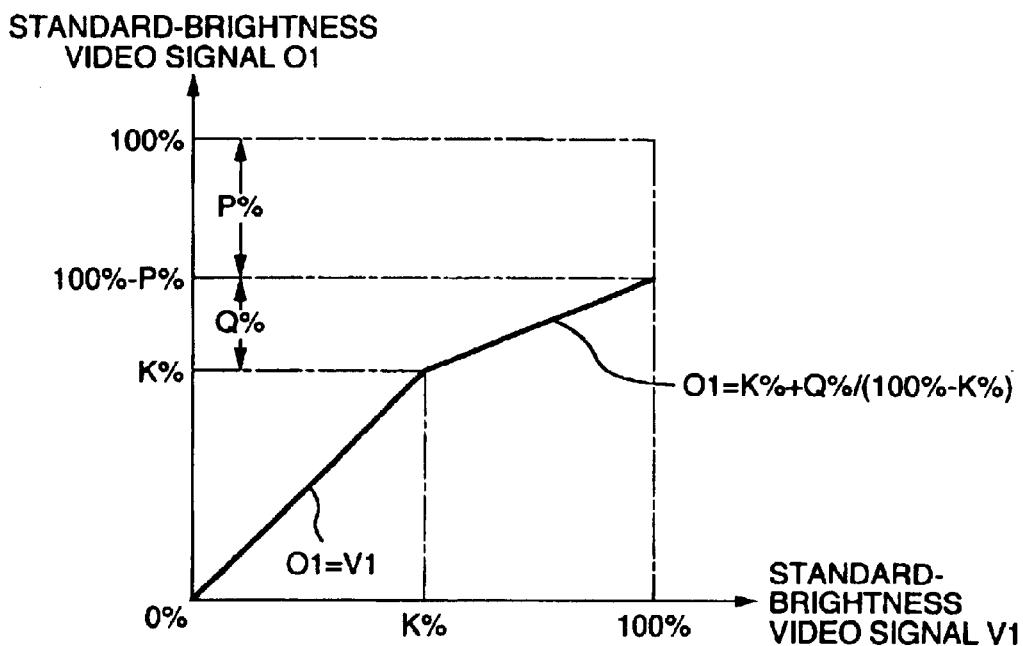
FIG. 34 is an example of the graph for the knee circuit in FIG. 30.
Figure 35:
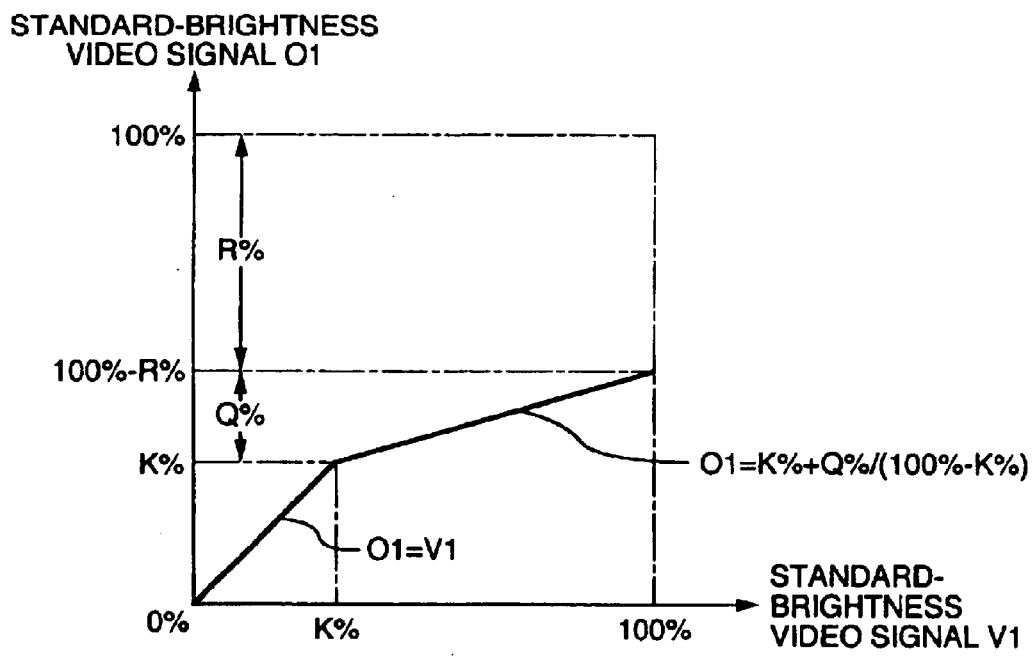
FIG. 35 is another example of the graph for the knee circuit in FIG. 30.

The knee process is performed as shown in FIG. 34 when 100%−R%≧P%, and as shown in FIG. 35 when 100%−R%<P%.

In other words, when the level is lower than the knee point K, the standard-brightness video signal 01 is not compressed in its tone, and when the level is equal to or larger than the knee point K it has a constant knee coefficient L even if any level of high-brightness video signal V2 is supplied.

The standard-brightness video signal 01 and high-brightness video signal 02 are combined by the combining circuit 77 to produce the wide dynamic range video signal W.

Figure 36:
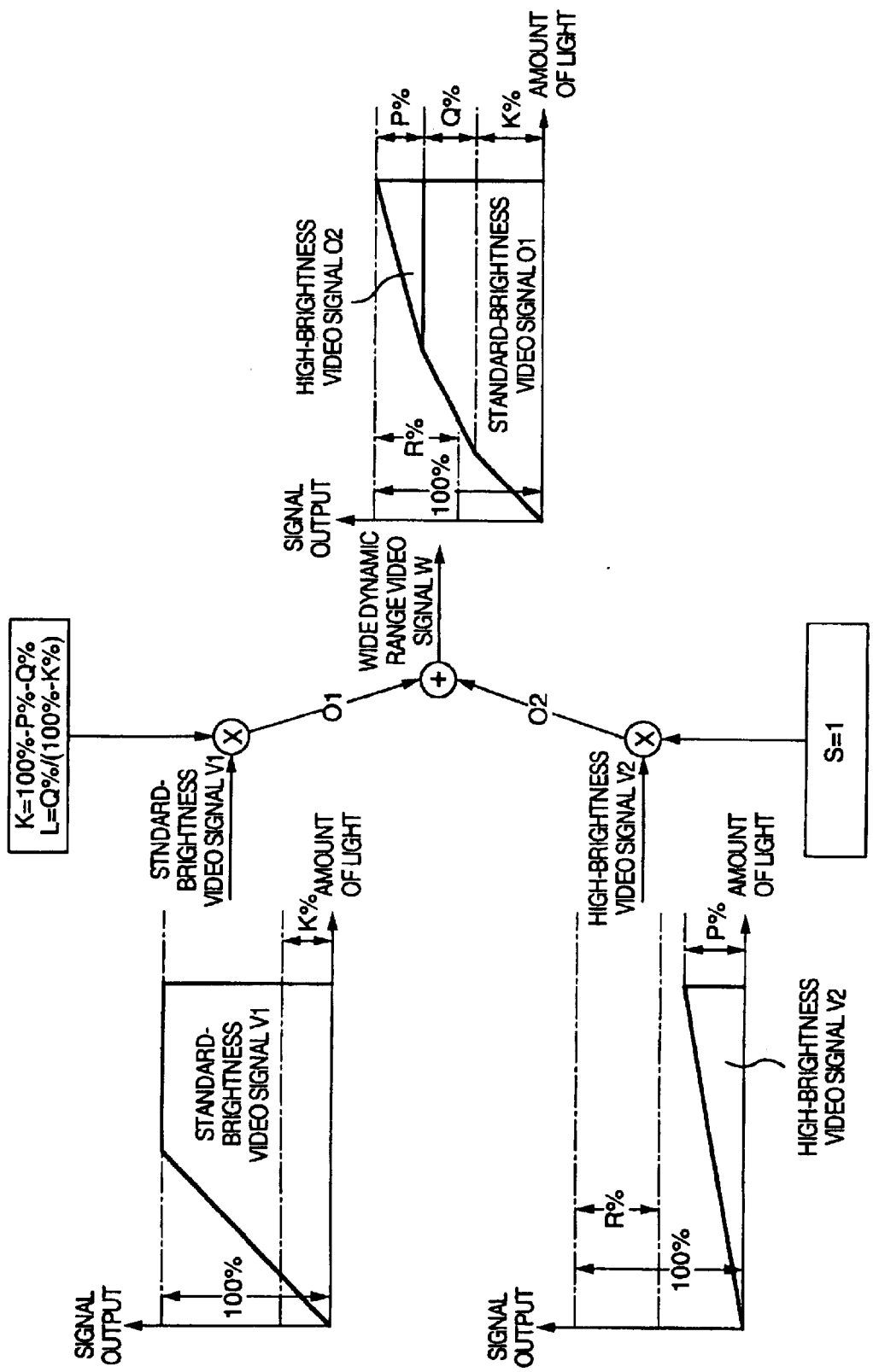
FIG. 36 is a diagram useful for explaining the signal combining process in the signal processor in FIG. 30.

Thus, when the peak value P is equal to or smaller than 100%−R%, as shown in FIGS. 33, 36 the multiplication factor S is set to 1 in order not to attenuate the high-brightness video signal V2, P% is assigned to the proportion of the high-brightness video signal 02 in the wide dynamic range video signal W, and the remaining 100%−P% to the standard-brightness video signal 01. Moreover, for the standard-brightness video signal 01 of a lower than knee point K, the knee coefficient L is selected as Q% (100%−K%) not to compress the tone, so that the wide dynamic range video signal W can be kept at 100% amplitude.

Figure 37:
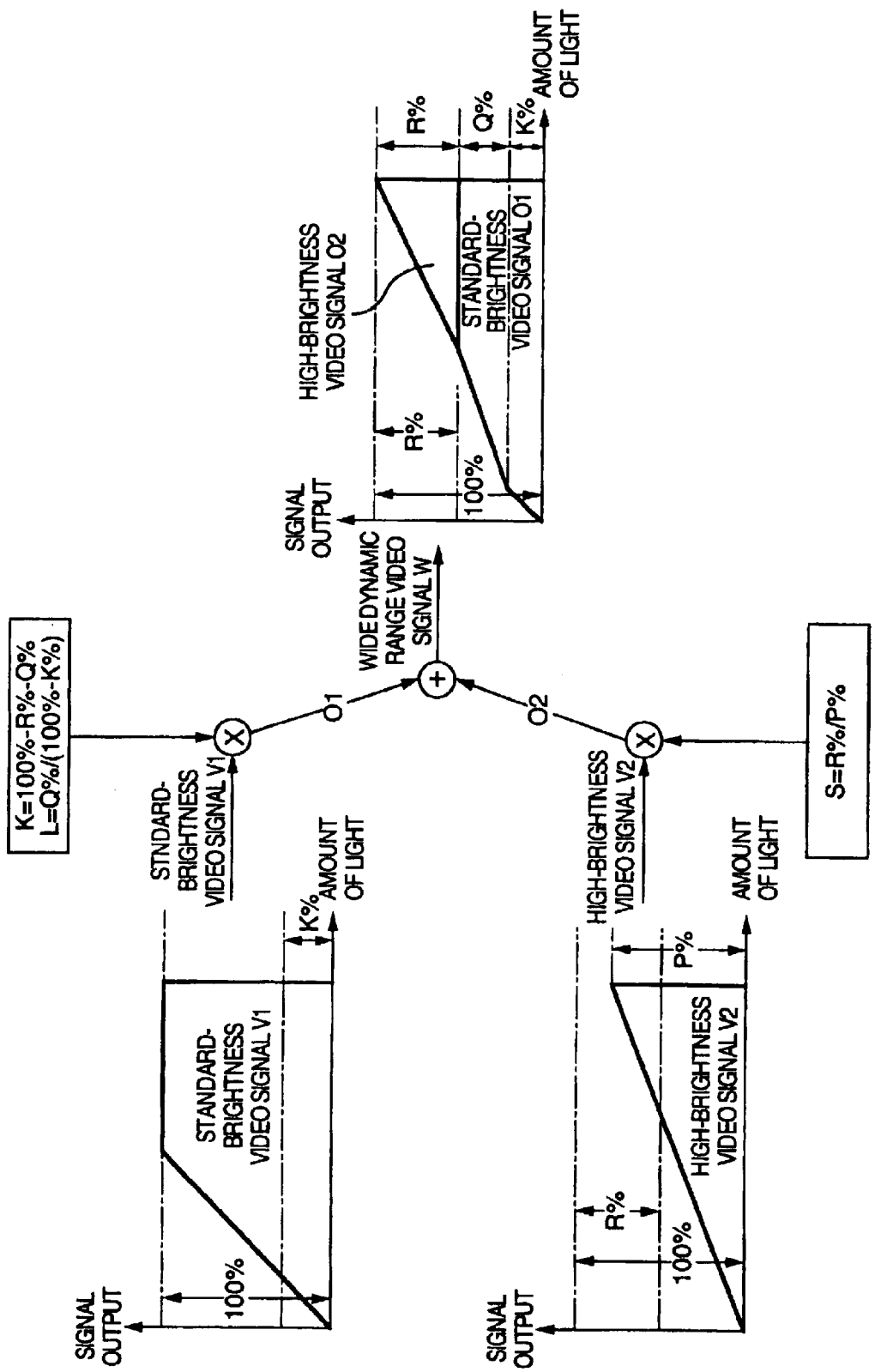
FIG. 37 is a diagram useful for explaining the signal combining process in the signal processor in FIG. 30.

When the peak value P is larger than 100%−R%, as shown in FIGS. 33, 37 the knee coefficient L is set to Q%/(100%−K%) in order that the standard-brightness video signal V1 lower than the knee point K is not compressed in its tone, thereby fixing the proportion of the standard-brightness video signal 01 in the wide dynamic range video signal W to 100%−R%. The multiplication coefficient S is set to R%/P% so that the remaining R% is assigned to the standard-brightness video signal 02. Thus, the wide dynamic range video signal W can always be kept at 100% amplitude.

Thus, the wide dynamic range video signal of 100% amplitude can be always generated even if the high-brightness video signal has any amplitude level, and since the tone below the knee point is not compressed, the standard-brightness and high-brightness video signals of optimum levels can be combined to produce the wide dynamic range video signal.

According to this embodiment, since the standard-brightness and high-brightness video signals of optimum levels are combined according to the histograms of certain ranges of levels, and peak values of the video signals, the wide dynamic range video signal can be generated without loss and with optimum levels, and the dynamic range of the video signal is wide.

What is claimed is:

1. A television signal processor for generating a wide dynamic range video signal on the basis of a first video signal matched to the brightness of a low-brightness region of an object image, and a second video signal matched to the brightness of a high-brightness region of said object image, comprising:

means for detecting histogram values of a particular signal level region of said second video signal;

means for determining a combining ratio of said first and second video signals according to said detected histogram value;

means for detecting a peak value of said second video signal;

nonlinear processing means for nonlinear-processing said first video signal according to said detected peak value and said combining ratio; and combining means for combining said nonlinear-processed first video signal and said second video signal at said determined combining ratio.

2. A television signal processor according to claim 1, wherein said nonlinear processing means includes at least any one of knee characteristic correction means and gamma correction means, and at least any one of the knee characteristic of said knee characteristic correction means and the gamma value of said gamma correction means is changed according to said peak value and said combining ratio.

3. A television signal processor according to claim 2, wherein if the proportion, of said first video signal of which the level is above the knee point, in said wide dynamic range video signal is represented by Q%, the maximum proportion of said second video signal in said wide dynamic range video signal by R%, the ratio of said peak value to the maximum value of said wide dynamic range video signal by P%, the knee coefficient of said first video signal by L, and the proportion of said second video signal by S, said means for determining said combining ratio sets as K=100−P−Q
L=Q/(100−K)
S=1
(if K<0, then K=0) when 100−R≧P, and
K=100−R−Q
L=Q/(100−K)
S=R/P
(if K<0, then K=0) when 100−R<P.

4. A television camera for generating a wide dynamic range video signal, comprising:

imaging means for generating a first video signal matched to the brightness of a low-brightness region of an object image, and a second video signal matched to the brightness of a high-brightness region of said object image; and a signal processor for generating said wide dynamic range video signal on the basis of said first and second video signals, said signal processor comprising:

means for detecting a histogram value of a particular signal level region of said second video signal;

means for determining a combining ratio of said first and second video signals according to said detected histogram value;

means for detecting a peak value of said second video signal;

nonlinear processing means for nonlinear-processing said first video signal according to said detected peak value and said combining ratio; and combining means for combining said nonlinear-processed first video signal and said second video signal at said determined combining ratio.

5. A television camera according to claim 4, wherein said first and second video signals are produced by exposure to light from the same object under different exposure conditions.

6. A television camera according to claim 5, further comprising an imager for producing said first and second video signals by exposure to light from the same object for different exposure times, respectively.

7. A television camera according to claim 4, further comprising an amplifier for amplifying at different gains said first and second video signals produced by shooting the object to produce said amplified first and second video signals.

8. A television signal processing method for generating a wide dynamic range video signal on the basis of a first video signal matched to the brightness of a low-brightness region of an object image, and a second video signal matched to the brightness of a high-brightness region of said object image, comprising the steps of:

detecting a histogram value of a particular signal level region of said second video signal;

determining a combining ratio of said first and second video signals according to said detected histogram value;

detecting a peak value of said second video signal;

nonlinear-processing said first video signal according to said detected peak value and said combining ratio; and combining said nonlinear-processed first video signal and said second video signal at said determined combining ratio.

* * * * *